![US011831845B2]

(12) United States Patent
Moriwaki

(10) Patent No.: US 11,831,845 B2
(45) Date of Patent: Nov. 28, 2023

(54) IMAGE PROCESSING APPARATUS, INFORMATION PROCESSING SYSTEM, IMAGE PROCESSING METHOD, AND NON-TRANSITORY COMPUTER-EXECUTABLE MEDIUM

(71) Applicant: Atsushi Moriwaki, Kanagawa (JP)

(72) Inventor: Atsushi Moriwaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/951,372

(22) Filed: Sep. 23, 2022

(65) Prior Publication Data
US 2023/0120180 A1    Apr. 20, 2023

(30) Foreign Application Priority Data

Oct. 19, 2021  (JP) .................................. 2021-171065

(51) Int. Cl.
*H04N 1/60* (2006.01)
(52) U.S. Cl.
CPC ......... *H04N 1/6027* (2013.01); *H04N 1/6008* (2013.01); *H04N 2201/0005* (2013.01)
(58) Field of Classification Search
CPC ............... H04N 1/6027; H04N 1/6008; H04N 2201/0005; H04N 1/6033
See application file for complete search history.

(56) References Cited

U.S. PATENT DOCUMENTS

| 2009/0208101 A1* | 8/2009 | Harigai .................... H04N 1/46 382/167 |
| 2013/0176598 A1* | 7/2013 | Ishii ..................... H04N 1/6097 358/2.1 |

(Continued)

FOREIGN PATENT DOCUMENTS

| EP | 2257039 A2 * | 12/2010 | ......... H04N 1/40006 |
| JP | 2007-174125 A | 7/2007 | |

(Continued)

OTHER PUBLICATIONS

Extended European search report dated Mar. 1, 2023 issued in related European patent application No. 22197801.8.

*Primary Examiner* — Ted W Barnes
(74) *Attorney, Agent, or Firm* — Harness, Dickey & Pierce, P.L.C.

(57) ABSTRACT

An image processing apparatus includes circuitry. The circuitry acquires a first colorimetric value of a target color mixture from a chart printed out in a first state. The circuitry acquires a second colorimetric value of an adjacent color mixture and acquires a second colorimetric value of an adjacent color mixture from a chart printed out in a second state. The circuitry acquires a third colorimetric value of a pre-correction color mixture. The circuitry adds a difference between the first colorimetric value and the second colorimetric value to the third colorimetric value and calculates a predicted colorimetric. The circuitry determines whether a color difference between the predicted colorimetric value and the first colorimetric value. The circuitry acquires, as a correction value, the second gradation value corresponding to the second colorimetric value. The circuitry corrects a corresponding one of the one or more first gradation values by using the correction value.

9 Claims, 18 Drawing Sheets

(56) References Cited

U.S. PATENT DOCUMENTS

| | | | | |
|---|---|---|---|---|
| 2016/0139529 A1* | 5/2016 | Iguchi | ................ | G03G 15/5062 |
| | | | | 399/39 |
| 2016/0239728 A1 | 8/2016 | Suzuki | | |
| 2020/0064196 A1 | 2/2020 | Inada | | |
| 2020/0302253 A1* | 9/2020 | Shibuya | ................ | G06K 15/027 |
| 2021/0014384 A1* | 1/2021 | Matsuoka | ............ | H04N 1/6055 |

FOREIGN PATENT DOCUMENTS

| | | | | | |
|---|---|---|---|---|---|
| JP | 2007174125 A | * | 7/2007 | | |
| JP | 2008-288722 | | 11/2008 | | |
| JP | 2008288722 A | * | 11/2008 | | |
| JP | 2012-119799 | | 6/2012 | | |
| JP | 5617567 B2 | * | 11/2014 | ........... | H04N 1/6033 |
| JP | 2020-151967 | | 9/2020 | | |
| JP | 2020151967 A | * | 9/2020 | ........... | G06K 15/027 |
| JP | 2021-150803 | | 9/2021 | | |
| JP | 2021150803 A | * | 9/2021 | | |
| JP | 2023061208 A | * | 5/2023 | ........... | H04N 1/6008 |

\* cited by examiner

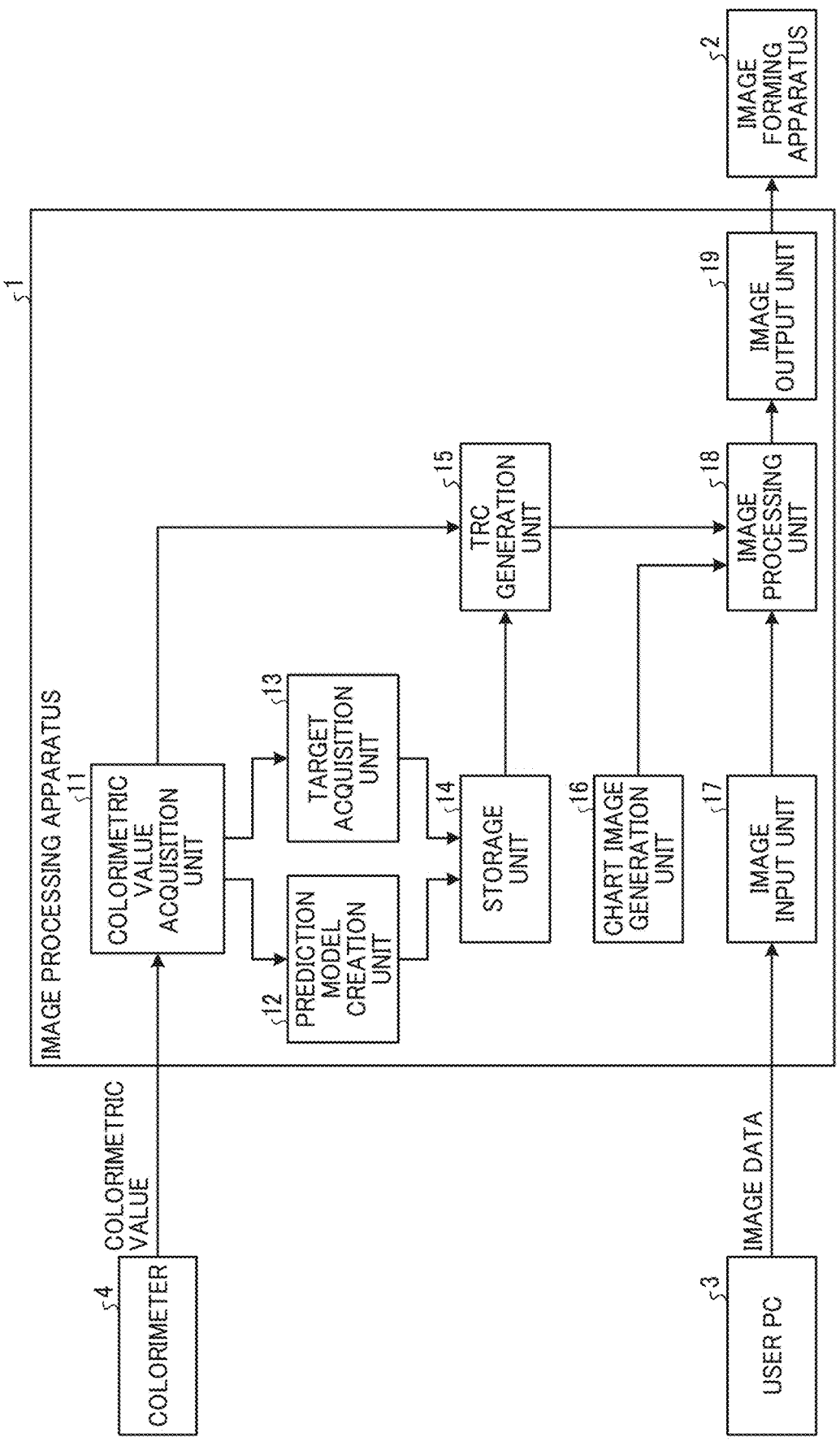

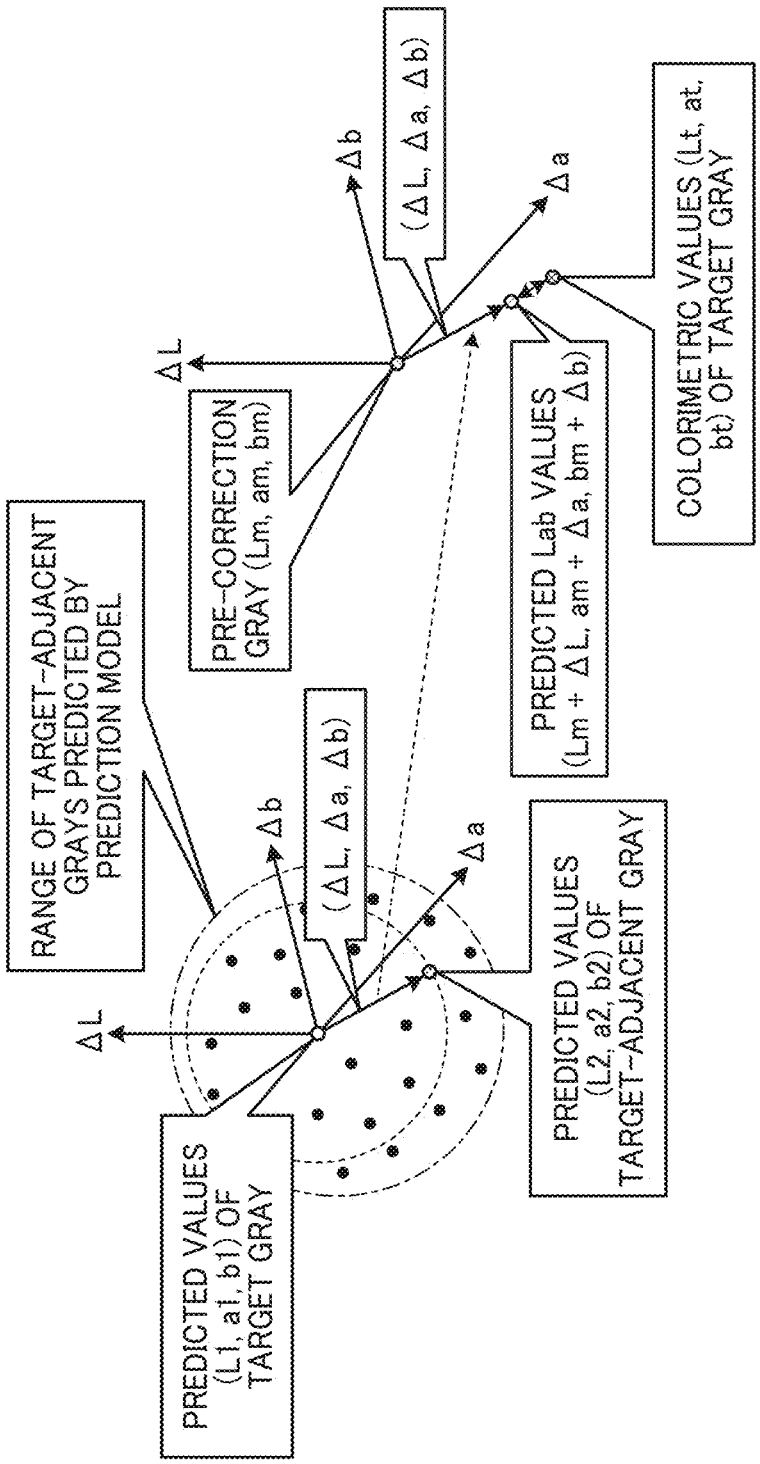

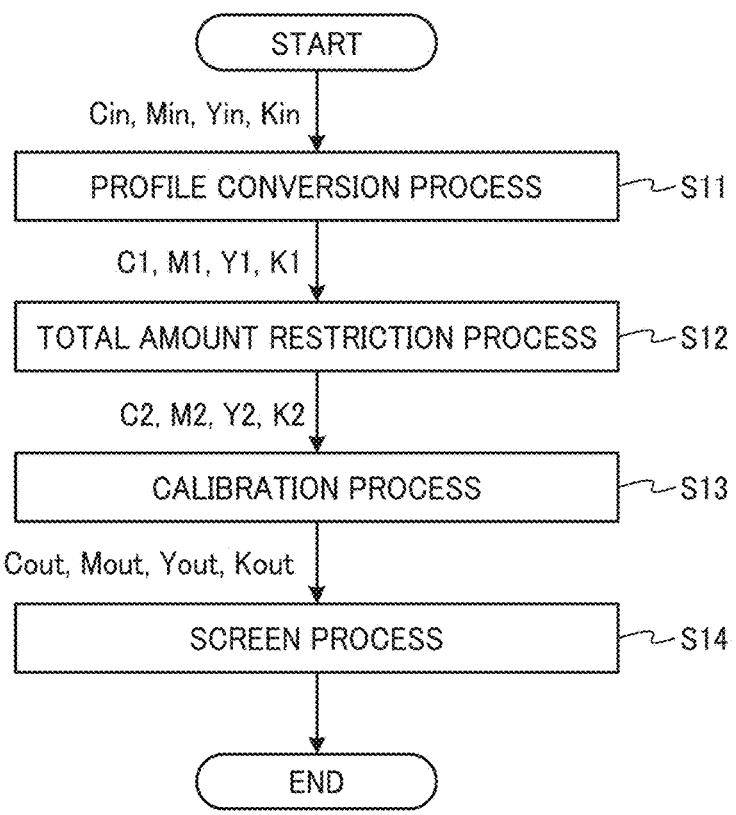
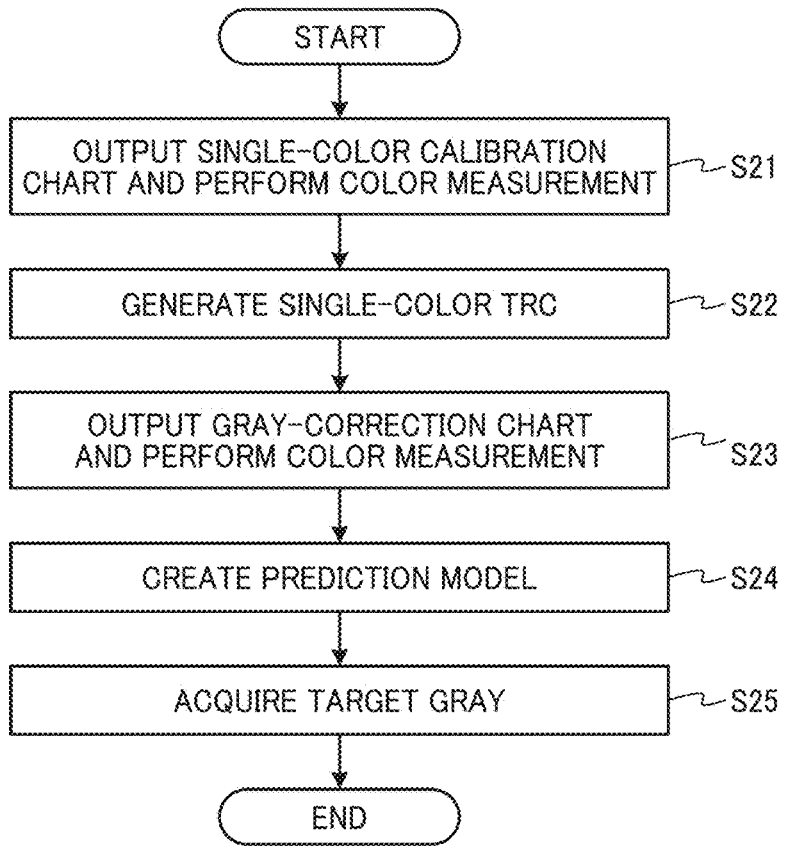

IMAGE PROCESSING APPARATUS, INFORMATION PROCESSING SYSTEM, IMAGE PROCESSING METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2021-171065, filed on Oct. 19, 2021, in the Japan Patent Office, the entire disclosure of which is hereby incorporated by reference herein.

BACKGROUND

Technical Field

Embodiments of the present disclosure relate to an image processing apparatus, an information processing system, an image processing method, and a non-transitory computer-executable medium.

Related Art

A printed material output from an image forming apparatus changes in color over time. To address this issue, color matching is periodically performed. The periodic color matching involves appropriate color matching of grays, which are mixtures of cyan (C), magenta (M), and yellow (Y). In color matching to address a change in color mixture over time, colors adjacent to the colors to be subjected to color matching are output and colorimetric values thereof are acquired to identify the direction of color matching. To ensure the accuracy of color matching, it is desirable to acquire adjacent colors immediately before the color matching is performed.

For example, a technique such color matching is known according to which, to automatically and quickly perform gray balance adjustment, at a correction time, a gray adjacent to a target gray is output to measure a color mixing characteristic, and the target gray is corrected to a target value using the measurement result.

Further, for example, a technique is known that corrects colorimetric values acquired from an image during a print job to target values for calibration by using a prediction model created at the time of calibration to address a change in gradation characteristic.

SUMMARY

An embodiment of the present disclosure includes an image processing apparatus that performs color matching of colors acquired in two different states and having an identical target gradation value, the two different states including a first state and a second state. The image processing apparatus includes circuitry. The circuitry acquires a first colorimetric value of a target color mixture from a chart printed out from an image forming apparatus, based on one or more first gradation values, in the first state, the first colorimetric value corresponding to each of the one or more first gradation values. The circuitry acquires a second colorimetric value of an adjacent color mixture, for a second gradation value adjacent to at least one first gradation value among the one or more first gradation values, from the chart printed out from the image forming apparatus in the first state and acquire a second colorimetric value of an adjacent color mixture, for a second gradation value adjacent to a remaining first gradation value other than the at least one first gradation value among the one or more first gradation values, from a chart printed out from the image forming apparatus in the second state, the second state being a state that occurs chronologically after the first state. The circuitry acquires a third colorimetric value of a pre-correction color mixture from a chart printed out from the image forming apparatus, based on each of the one or more first gradation values, in the second state, the third colorimetric value corresponding to each of the one or more first gradation values. The circuitry adds a difference between the first colorimetric value and the second colorimetric value corresponding to the first colorimetric value to the third colorimetric value corresponding to the first colorimetric value and calculate a predicted colorimetric value of the target color mixture. The circuitry determines whether a color difference between the predicted colorimetric value and the first colorimetric value corresponding to the predicted colorimetric value is less than or equal to a first threshold. The circuitry acquires, as a correction value, the second gradation value corresponding to the second colorimetric value from which the predicted colorimetric value corresponding to the color difference is calculated, in response to the color difference being less than or equal to the first threshold. The circuitry corrects a corresponding one of the one or more first gradation values by using the correction value such that a colorimetric value of the pre-correction color mixture becomes equal to a colorimetric value of the target color mixture.

An embodiment of the present disclosure includes an information processing system including the above-described image processing apparatus, the image forming apparatus, and a colorimeter to obtain the first colorimetric value, the second colorimetric value, and the third colorimetric value.

An embodiment of the present disclosure includes an image processing method for performing color matching of colors acquired in two different states and having an identical target gradation value, the two different states including a first state and a second state. The image processing method includes acquiring a first colorimetric value of a target color mixture from a chart printed out from an image forming apparatus, based on one or more first gradation values, in the first state, the first colorimetric value corresponding to each of the one or more first gradation values. The image processing method includes acquiring a second colorimetric value of an adjacent color mixture, for a second gradation value adjacent to at least one first gradation value among the one or more first gradation values, from the chart printed out from the image forming apparatus in the first state and acquiring a second colorimetric value of an adjacent color mixture, for a second gradation value adjacent to a remaining first gradation value other than the at least one first gradation value among the one or more first gradation values, from a chart printed out from the image forming apparatus in the second state, the second state being a state that occurs chronologically after the first state. The image processing method includes acquiring a third colorimetric value of a pre-correction color mixture from a chart printed out from the image forming apparatus, based on each of the one or more first gradation values, in the second state, the third colorimetric value corresponding to each of the one or more first gradation values. The image processing method includes adding a difference between the first colorimetric value and the second colorimetric value corresponding to the first colorimetric value to the third colorimetric value corresponding to the first colorimetric value and calculating a predicted colorimetric value of the target color mixture. The image processing method includes determining whether a color difference between the predicted colorimetric value and the first colorimetric value corresponding to the predicted colorimetric value is less than or equal to a first threshold. The image processing method includes acquiring, as a correction value, the second gradation value corresponding to the second colorimetric value from which the predicted colorimetric value corresponding to the color difference is calculated, in response to the color difference being less than or equal to the first threshold. The image processing method includes correcting a corresponding one of the one or more first gradation values by using the correction value such that a colorimetric value of the pre-correction color mixture becomes equal to a colorimetric value of the target color mixture.

An embodiment of the present disclosure includes a non-transitory computer-executable medium storing a program storing instructions which, when executed by a processor, causes the computer to perform a method. The method includes acquiring a first colorimetric value of a target color mixture from a chart printed out from an image forming apparatus, based on one or more first gradation values, in the first state, the first colorimetric value corresponding to each of the one or more first gradation values. The method includes acquiring a second colorimetric value of an adjacent color mixture, for a second gradation value adjacent to at least one first gradation value among the one or more first gradation values, from the chart printed out from the image forming apparatus in the first state and acquiring a second colorimetric value of an adjacent color mixture, for a second gradation value adjacent to a remaining first gradation value other than the at least one first gradation value among the one or more first gradation values, from a chart printed out from the image forming apparatus in the second state, the second state being a state that occurs chronologically after the first state. The method includes acquiring a third colorimetric value of a pre-correction color mixture from a chart printed out from the image forming apparatus, based on each of the one or more first gradation values, in the second state, the third colorimetric value corresponding to each of the one or more first gradation values. The method includes adding a difference between the first colorimetric value and the second colorimetric value corresponding to the first colorimetric value to the third colorimetric value corresponding to the first colorimetric value and calculating a predicted colorimetric value of the target color mixture. The method includes determining whether a color difference between the predicted colorimetric value and the first colorimetric value corresponding to the predicted colorimetric value is less than or equal to a first threshold. The method includes acquiring, as a correction value, the second gradation value corresponding to the second colorimetric value from which the predicted colorimetric value corresponding to the color difference is calculated, in response to the color difference being less than or equal to the first threshold. The method includes correcting a corresponding one of the one or more first gradation values by using the correction value such that a colorimetric value of the pre-correction color mixture becomes equal to a colorimetric value of the target color mixture.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a diagram illustrating an example configuration of functional blocks of the image processing apparatus according to the first embodiment of the present disclosure;

FIG. 5 is a view illustrating an overview of a gray correction process of the image processing apparatus according to the first embodiment of the present disclosure;

FIG. 6 is a flowchart illustrating an example of image processing performed by the image processing apparatus according to the first embodiment of the present disclosure;

FIG. 7 is a flowchart illustrating an example of a target gray acquisition process of the image processing apparatus according to the first embodiment of the present disclosure;

Figure 1:
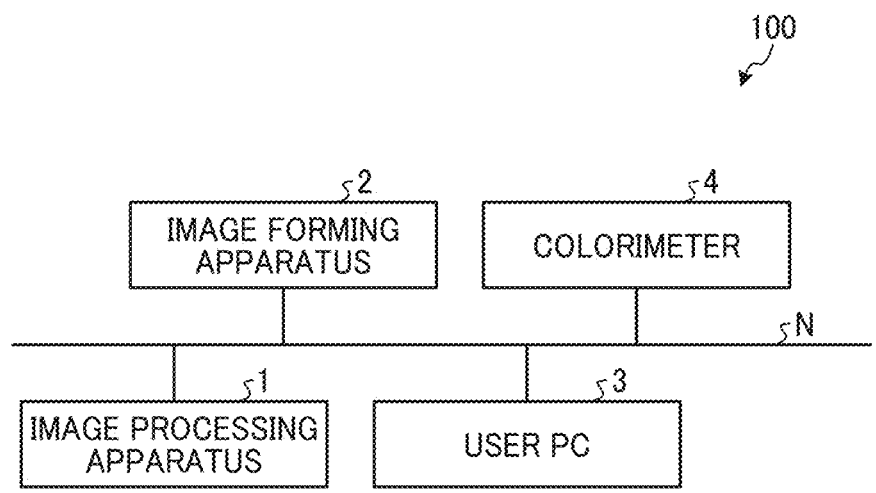
FIG. 1 is a diagram illustrating an example general arrangement of an information processing system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image processing apparatus, an information processing system, an image processing method, and a program according to one or more embodiments of the present disclosure will be described in detail hereinafter with reference to the drawings. The present disclosure, however, is not limited to the following one or more embodiments, and elements of the following one or more embodiments include elements that may be easily conceived by those skilled in the art, those being substantially the same ones, and those being within equivalent ranges. Furthermore, various omissions, substitutions, changes, and combinations of the constituent elements can be made without departing from the gist of the following one or more embodiments.

First Embodiment

General Arrangement of Information Processing System

FIG. 1 is a diagram illustrating an example general arrangement of an information processing system 100 according to a first embodiment. The general arrangement of the information processing system 100 according to this embodiment will be described with reference to FIG. 1.

As illustrated in FIG. 1, the information processing system 100 includes an image processing apparatus 1, an image forming apparatus 2, a user personal computer (PC) 3, and a colorimeter 4. The image processing apparatus 1, the image forming apparatus 2, the user PC 3, and the colorimeter 4 can perform data communication via a network N. The network N is a network such as a local area network (LAN). The network N may be a wired network or a wireless network.

The image processing apparatus 1 is an apparatus that performs color matching (correction process) of grays, which are mixtures of cyan (C), magenta (M), and yellow (Y), on a printed material to be output from the image forming apparatus 2. The image processing apparatus 1 may be, for example, an information processing apparatus such as a general-purpose PC. In one example, the image forming apparatus 2 is a printing machine for commercial use, and the image processing apparatus 1 is a digital front end (DFB). The color mixtures will be described as grays containing three colors of C, M, Y, as described above, as a non-limiting example. The color mixtures may be secondary colors or other mixtures of colors.

The image forming apparatus 2 is an apparatus that prints out an image based on image data output from the user PC 3 and subjected to image processing by the image processing apparatus 1.

The user PC 3 is an information processing apparatus that transmits image data to be printed to the image processing apparatus 1.

The colorimeter 4 is a device for performing color measurement on a chart printed out from the image forming apparatus 2. The colorimeter 4 transmits colorimetric values obtained by color measurement on the chart to the image processing apparatus 1. Examples of the colorimetric values include Lab values (color values) in the L*a*b* color space. The colorimeter 4 may be a device that automatically reads a printed chart placed thereon or a device that reads a printed chart by a manual operation.

Hardware Configuration of Image Processing Apparatus

Figure 2:
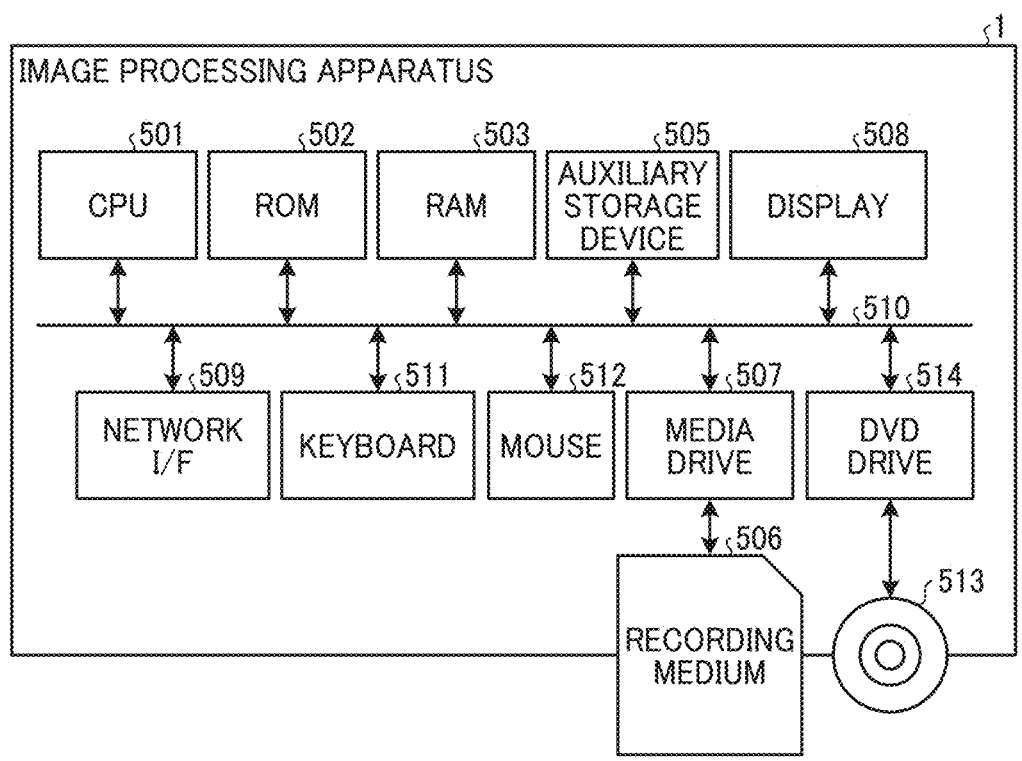
FIG. 2 is a diagram illustrating an example hardware configuration of an image processing apparatus according to the first embodiment of the present disclosure.

FIG. 2 is a diagram illustrating an example hardware configuration of the image processing apparatus 1 according to the first embodiment. The hardware configuration of the image processing apparatus 1 according to this embodiment will be described with reference to FIG. 2.

As illustrated in FIG. 2, the image processing apparatus 1 includes a central processing unit (CPU) 501, a read only memory (ROM) 502, a random access memory (RAM) 503, an auxiliary storage device 505, a media drive 507, a display 508, a network interface (I/F) 509, a keyboard 511, a mouse 512, and a digital versatile disc (DVD) drive 514.

The CPU 501 is an arithmetic processor that controls the overall operation of the image processing apparatus 1. The ROM 502 is a non-volatile storage device that stores a program initially executed by the CPU 501. Examples of such a program include an initial program loader (IPL). The RAM 503 is a volatile storage device used as a work area for the CPU 501.

The auxiliary storage device 505 is a non-volatile storage device that stores various data such as a program. Examples of the auxiliary storage device 505 include a hard disk drive (HDD) and a solid state drive (SSD).

The media drive 507 is a device that controls reading or writing of data from or to a recording medium 506 such as a flash memory.

The display 508 displays various types of information such as a cursor, a menu, a window, text, or an image. Examples of the display 508 include a liquid crystal display (LCD) and an organic electro-luminescence (EL) display.

The network I/F 509 is an interface for performing data communication using the network N. As one example, the network I/F 509 is a network interface card (NIC) or the like that enables communication using a protocol such as the transmission control protocol/Internet protocol (TCP/IP). The network I/F 509 may be a communication interface having a wireless communication function based on a standard such as Wireless Fidelity (Wi-Fi®).

The keyboard 511 is one example of an input device provided with a plurality of keys for inputting characters, numerical values, various instructions, or the like. The mouse 512 is a type of input device operated by a user to select or execute various instructions, select a target for processing, and move a cursor being displayed, for example.

The DVD drive 514 is a device that controls reading or writing of various data from or to a DVD 513, which is an example of a removable recording medium. Examples of the DVD 513 include a digital versatile disc rewritable (DVD- RW), a digital versatile disc recordable (DVD-R), a compact disc rewritable (CD-RW), and a compact disc recordable (CD-R).

The CPU 501, the ROM 502, the RAM 503, the auxiliary storage device 505, the media drive 507, the display 508, the network I/F 509, the keyboard 511, the mouse 512, and the DVD drive 514 described above are communicably connected to each other via a bus line 510 such as an address bus and a data bus.

The hardware configuration of the image processing apparatus 1 illustrated in FIG. 2 is an example. Not all of the components described above may be included in the image processing apparatus 1, and the image processing apparatus 1 may include any other component. The user PC 3 has a hardware configuration similar to that illustrated in FIG. 2.

Hardware Configuration of Image Forming Apparatus

Figure 3:
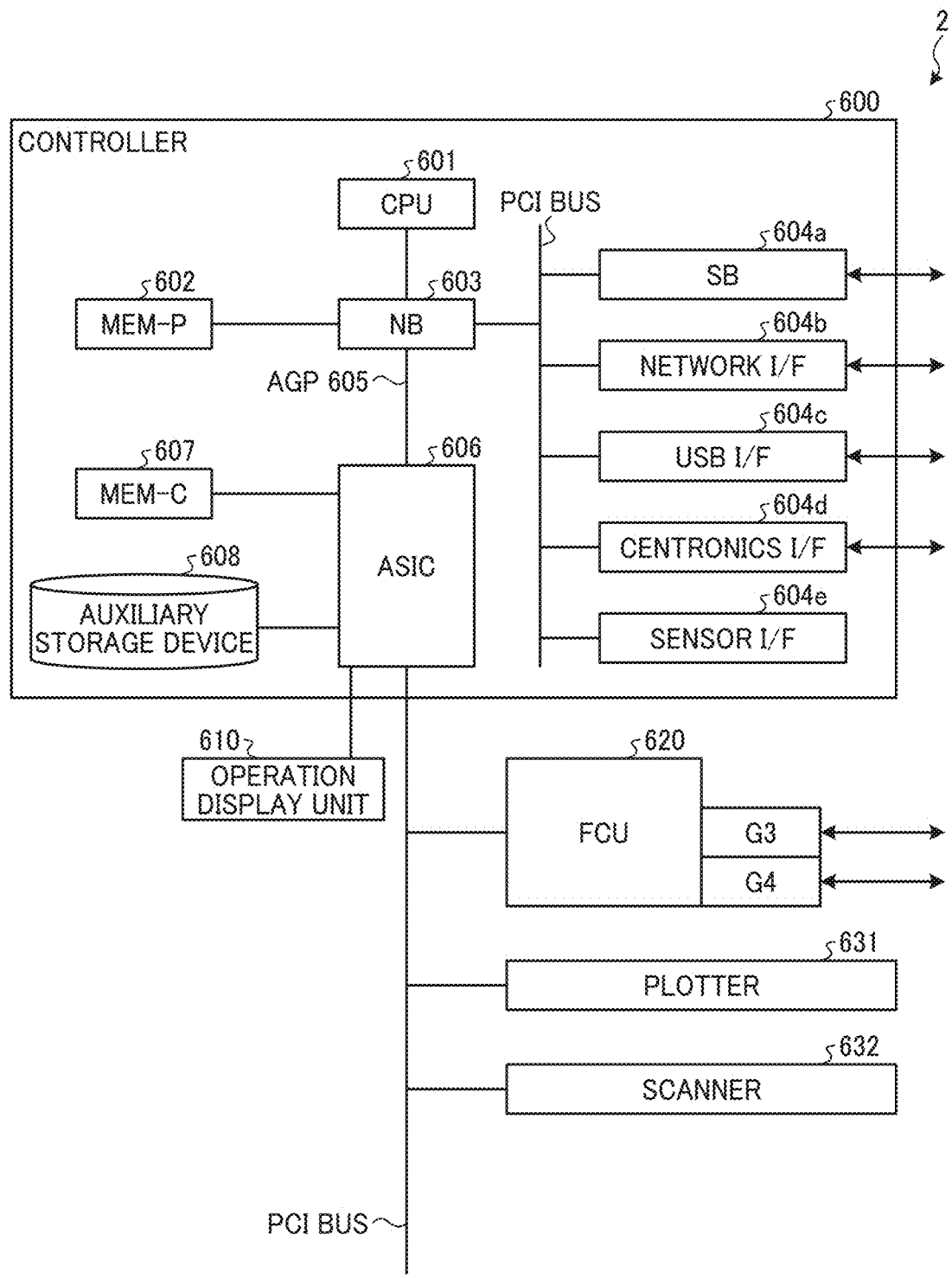
FIG. 3 is a diagram illustrating an example hardware configuration of an image forming apparatus according to the first embodiment of the present disclosure.

FIG. 3 is a diagram illustrating an example hardware configuration of the image forming apparatus 2 according to the first embodiment. The hardware configuration of the image forming apparatus 2 will be described with reference to FIG. 3.

As illustrated in FIG. 3, the image forming apparatus 2 includes a controller 600, an operation display unit 610, a facsimile control unit (FCU) 620, a plotter 631, and a scanner 632. The controller 600, the operation display unit 610, the FCU 620, the plotter 631, and the scanner 632 are interconnected by a peripheral component interface (PCI) bus.

The controller 600 is a device that controls the overall operation of the image forming apparatus 2. For example, the controller 600 controls drawing, communication, and input from the operation display unit 610.

The operation display unit 610 is a device that accepts an input to the controller 600 (input function) and displays the state of the image forming apparatus 2 and other information on the image forming apparatus 2 (display function). Examples of the operation display unit 610 include a touch panel. The operation display unit 610 is directly connected to an application specific integrated circuit (ASIC) 606 described below.

The FCU 620 is a device that implements a facsimile function, and is connected to the ASIC 606 via, for example, a PCI bus.

The plotter 631 is a device that implements a print function, and is connected to the ASIC 606 via, for example, a PCI bus. The scanner 632 is a device that implements a scanner function, and is connected to the ASIC 606 via, for example, a PCI bus.

The controller 600 includes a CPU 601, a system memory (MEM-P) 602, a northbridge (NB) 603, a southbridge (SB) 604*a*, a network I/F 604*b*, a Universal Serial Bus (USB) I/F 604*c*, a Centronics I/F 604*d*, a sensor I/F 604*e*, the ASIC 606, a local memory (MEM-C) 607, and an auxiliary storage device 608.

The CPU 601 is an arithmetic processor that performs overall control of the image forming apparatus 2. The CPU 601 is connected to a chipset including the system memory 602, the northbridge 603, and the southbridge 604*a* and is connected to another device via the chipset.

The system memory 602 is used as a memory for storing programs and data, a memory for loading programs and data, and a memory for storing drawing data of a printer, for example. The system memory 602 includes a ROM and a RAM. The ROM is a read-only memory for storing programs and data. The RAM is a writable and readable memory for loading programs and data and storing drawing data of the printer, for example.

The northbridge 603 is a bridge for connecting the CPU 601 to the system memory 602, the southbridge 604*a*, and an accelerated graphics port (AGP) bus 605. The northbridge 603 includes a memory controller that controls reading and writing of data from and to the system memory 602. The northbridge 603 further includes a PCI master and an AGP target.

The southbridge 604*a* is a bridge for connecting the northbridge 603 to PCI devices and peripheral devices. The southbridge 604*a* is connected to the northbridge 603 via a PCI bus, and the PCI bus is connected to the network I/F 604*b*, the USB I/F 604*c*, the Centronics I/F 604*d*, and the sensor I/F 604*e*, for example.

The AGP bus 605 is a bus interface for a graphics accelerator card to accelerate graphics processing. The AGP bus 605 can speed up the graphics accelerator card by directly accessing the system memory 602 with high throughput.

The ASIC 606 is an integrated circuit (IC) for use in image processing and includes hardware elements for image processing. The ASIC 606 serves as a bridge for connecting the AGP bus 605, the PCI bus, the auxiliary storage device 608, and the local memory 607 to each other. The ASIC 606 includes a PCI target, an AGP master, an arbiter (ARB) as a core of the ASIC 606, a memory controller, a plurality of direct memory access controllers (DMACs), and a PCI unit. The memory controller controls the local memory 607. The DMACs are configured to, for example, rotate image data with a hardware logic. The PCI unit transfers data to the plotter 631 and the scanner 632 via a PCI bus. The ASIC 606 is connected to, for example, the FCU 620, the plotter 631, and the scanner 632 via a PCI bus.

The local memory 607 is used as a copy image buffer and a code buffer.

The auxiliary storage device 608 is a storage device such as an HDD, an SSD, a Secure Digital (SD) card, or a flash memory. The auxiliary storage device 608 stores image data, programs, font data, and forms.

The hardware configuration of the image forming apparatus 2 illustrated in FIG. 3 is an example. Not all of the components described above may be included in the image forming apparatus 2, and the image forming apparatus 2 may include any other component. In one example, the image forming apparatus 2 includes an automatic document feeder (ADF).

Configuration and Operation of Functional Blocks of Image Processing Apparatus

FIG. 4 is a diagram illustrating an example configuration of functional blocks of the image processing apparatus 1 according to the first embodiment. The configuration and operation of the functional blocks of the image processing apparatus 1 according to this embodiment will be described with reference to FIG. 4.

As illustrated in FIG. 4, the image processing apparatus 1 includes a colorimetric value acquisition unit 11, a prediction model creation unit 12 (second acquisition unit, creation unit), a target acquisition unit 13 (first acquisition unit), a storage unit 14, a tone reproduction curve (TRC) generation unit 15 (third acquisition unit, first calculation unit, first determination unit, fourth acquisition unit), a chart image generation unit 16, an image input unit 17, an image processing unit 18 (correction unit), and an image output unit 19.

The colorimetric value acquisition unit 11 is a functional unit that acquires colorimetric values via the network I/F 509. The colorimetric values are obtained by the colorimeter 4 performing color measurement on a chart printed by the image forming apparatus 2. The colorimetric value acquisition unit 11 is implemented by, for example, the CPU 501 illustrated in FIG. 2 executing a program.

The prediction model creation unit 12 is a functional unit that creates a prediction model, based on the colorimetric values acquired by the colorimetric value acquisition unit 11. The prediction model is used to predict a colorimetric value from the dot area ratio of a color. For example, the prediction model creation unit 12 creates a prediction model serving as a learning model by a learning process based on supervised learning or the like. The prediction model creation unit 12 creates respective prediction models for dot area ratios of target grays, which will be described below, and stores the prediction models in the storage unit 14. The dot area ratios may be referred to as device values. The prediction model creation unit 12 is implemented by, for example, the CPU 501 illustrated in FIG. 2 executing a program.

The target acquisition unit 13 is a functional unit that acquires target single colors and target grays from the colorimetric values acquired by the colorimetric value acquisition unit 11. Each of the target single colors is a target value of a corresponding one of the single colors of CMY. The target grays are target values of grays that are mixed colors. The target values are each indicated by, for example, a density, a distance from paper white, or the like. The target acquisition unit 13 stores the acquired target single colors and target grays in the storage unit 14. The target acquisition unit 13 is implemented by, for example, the CPU 501 illustrated in FIG. 2 executing a program.

The storage unit 14 is a functional unit that stores prediction models, various TRCs, and the like. The storage unit 14 is implemented by the RAM 503 or the auxiliary storage device 505 illustrated in FIG. 2.

The TRC generation unit 15 is a functional unit that generates single-color TRCs, based on the colorimetric values of the single colors acquired by the colorimetric value acquisition unit 11 and the target single colors stored in the storage unit 14. Further, the TRC generation unit 15 generates gray-corrected single-color TRCs, based on pre-correction grays and the target grays and the prediction models stored in the storage unit 14. The pre-correction grays are acquired by the colorimetric value acquisition unit 11 at a correction time. The details of the single-color TRCs and the gray-corrected single-color TRCs will be described below. Like the target grays, the pre-correction grays are each indicated by, for example, a density, a distance from paper white, or the like. The TRC is a one-dimensional conversion curve for converting an input gradation into an output gradation. The TRC generation unit 15 is implemented by, for example, the CPU 501 illustrated in FIG. 2 executing a program.

The chart image generation unit 16 is a functional unit that generates a chart image. The chart image is used to acquire the target grays, create the prediction models, and perform a gray correction process. The chart image generation unit 16 is implemented by, for example, the CPU 501 illustrated in FIG. 2 executing a program.

The image input unit 17 is a functional unit that receives input of image data transmitted from the user PC 3 via the network I/F 509 illustrated in FIG. 2. The image input unit 17 is implemented by, for example, the CPU 501 illustrated in FIG. 2 executing a program.

The image processing unit 18 is a functional unit that converts an input device value in the image data input from the image input unit 17 and the chart image generated by the chart image generation unit 16 into a device value in a format to be printed out from the image forming apparatus 2. The image processing unit 18 is implemented by, for example, the CPU 501 illustrated in FIG. 2 executing a program.

The image output unit 19 is a functional unit that outputs an image to the image forming apparatus 2 via the network I/F 509 illustrated in FIG. 2 to print out the image, based on the data on which image processing has been performed by the image processing unit 18. The image output unit 19 is implemented by, for example, the CPU 501 illustrated in FIG. 2 executing a program.

The colorimetric value acquisition unit 11, the prediction model creation unit 12, the target acquisition unit 13, the TRC generation unit 15, the chart image generation unit 16, the image input unit 17, the image processing unit 18, and the image output unit 19 of the image processing apparatus 1 illustrated in FIG. 4 are not limited to being implemented by the CPU 501 illustrated in FIG. 2 executing a program. For example, the colorimetric value acquisition unit 11, the prediction model creation unit 12, the target acquisition unit 13, the TRC generation unit 15, the chart image generation unit 16, the image input unit 17, the image processing unit 18, and the image output unit 19 of the image processing apparatus 1 illustrated in FIG. 4 may be implemented by hardware such as integrated circuits or by a combination of software and hardware.

The functional units of the image processing apparatus 1 illustrated in FIG. 4 are conceptually illustrated functions and are not limited to the illustrated components. For example, a plurality of functional units that are illustrated as independent functional units of the image processing apparatus 1 illustrated in FIG. 4 may be combined into one functional unit. Alternatively, a function of one of the functional units of the image processing apparatus 1 illustrated in FIG. 4 may be divided into a plurality of functions to form a plurality of functional units.

Overview of Gray Correction Process

FIG. 5 is a view illustrating an overview of a gray correction process of the image processing apparatus 1 according to the first embodiment. An overview of the gray correction process of the image processing apparatus 1 according to this embodiment will be described with reference to FIG. 5.

In this embodiment, at the time of acquiring a target gray, the image processing apparatus 1 acquires a target-adjacent gray, which is a gray adjacent to the target gray. The target gray is an example of a target color mixture, and the target-adjacent gray is an example of an adjacent color mixture. The time of acquiring a target gray is hereinafter also referred to as a first state. The image processing apparatus 1 uses the acquired target-adjacent gray to create a prediction model for predicting colorimetric values such as Lab values from the device value of a gray.

As described above, a printed material output from the image forming apparatus 2 may change in color over time. For example, as illustrated in FIG. 5, a target gray to be corrected at a correction time is referred to as a pre-correction gray. The pre-correction gray is an example of a pre-correction color mixture. The correction time is hereinafter also referred to as a second state. In this case, as illustrated in FIG. 5, the colorimetric values (Lab values) of the pre-correction gray are represented by (Lm, am, bm). Also in the second state, the image processing apparatus 1 acquires a target-adjacent gray and creates a prediction model by using the target-adjacent gray. The second state occurs chronologically after the first state.

At the time of correction of a pre-correction gray corresponding to a specific target gray (i.e., at the second state), the image processing apparatus 1 sets, as predicted values (L1, a1, b1), colorimetric values predicted from the device value of the target gray by using a prediction model, and sets, as predicted values (L2, a2, b2), colorimetric values predicted from the device value of a gray adjacent to the specific target gray by using the prediction model. A gray with low gradation (e.g., a device value of 10%) tends to have a large amount of change (shift) over time between the first state and the second state, and a gray with high gradation (e.g., a device value of 20%) tends to have a small shift between the first state and the second state. Accordingly, when the target gray has high gradation, the image processing apparatus 1 determines that the shift is small, and determines the predicted values (L1, a1, b1) and the predicted values (L2, a2, b2) by using the prediction model created in the first state. By contrast, when the target gray has low gradation, the image processing apparatus 1 determines that the shift is large, and determines the predicted values (L1, a1, b1) and the predicted values (L2, a2, b2) by using the prediction model created in the second state, which is the correction time. Accordingly, a prediction model corresponding to a high-gradation target-adjacent gray is created in the first state, and a prediction model corresponding to a low-gradation target-adjacent gray is created in the second state.

Then, the image processing apparatus 1 adds a difference (ΔL, Δa, Δb) between the predicted values (L2, a2, b2) and the predicted values (L1, a1, b1), which is given by (ΔL, Δa, Δb)=(L2−L1, a2−a1, b2−b1), to the colorimetric values (Lm, am, bm) of the pre-correction gray to determine predicted Lab values (Lm+ΔL, am+Δa, bm+Δb). Then, the image processing apparatus 1 determines whether the color difference between colorimetric values (Lt, at, bt) of the target gray in the second state and the predicted Lab values (Lm+ΔL, am+Δa, bm+Δb) is less than or equal to a predetermined threshold. The color difference may be ΔE2000, for example. If it is determined that the color difference is less than or equal to the threshold, the image processing apparatus 1 acquires the device value (dot area ratio) of the gray adjacent to the specific target gray as a correction value for the device value of the specific target gray. That is, when the difference (ΔL, Δa, Δb) between the predicted values (L2, a2, b2) of the target-adjacent gray and the predicted values (L1, a1, b1) of the target gray, which are calculated by using the prediction model, is added to the colorimetric values (Lm, am, bm) of the pre-correction gray, a target-adjacent gray having colorimetric values closest to the colorimetric values (Lt, at, bt) of the target gray is searched for by using the prediction model and is corrected.

The details of the processes performed by the image processing apparatus 1, including the gray correction process, will be described hereinafter with reference to FIGS. 6 to 12.

Image Processing of Image Processing Apparatus

FIG. 6 is a flowchart illustrating an example of image processing performed by the image processing apparatus 1 according to the first embodiment. The image processing performed by the image processing apparatus 1 according to this embodiment will be described with reference to FIG. 6.

Step S11

The image processing unit 18 performs a profile conversion process. Namely, the image processing unit 18 converts an input device value (Cin, Min, Yin, Kin) of image data input from the image input unit 17 into an intermediate device value (C1, M1, Y1, K1) by using an International Color Consortium (ICC) profile. The process then proceeds to step S12.

Step S12

Then, the image processing unit 18 performs a total amount restriction process. Namely, the image processing unit 18 replaces an intermediate device value exceeding a total amount value that can be output from the image forming apparatus 2 with an intermediate device value (C2, M2, Y2, K2). The intermediate device value (C2, M2, Y2, K2) is less than or equal to the total amount value. The process then proceeds to step S13.

Step S13

Then, the image processing unit 18 performs a calibration process. Namely, the image processing unit 18 converts the intermediate device value (C2, M2, Y2, K2) into an output device value (Cout, Mout, Yout, Kout) by using the single-color TRC generated by the TRC generation unit 15. The process then proceeds to step S14.

Step S14

Finally, the image processing unit 18 performs a screen process. Namely, the image processing unit 18 converts the image data including the output device value (Cout, Mout, Yout, Kout) into halftone dot data to be used to output the image data from the image forming apparatus 2. Then, the image processing performed by the image processing apparatus 1 ends.

Target Gray Acquisition Process of Image Processing Apparatus

Figure 8:
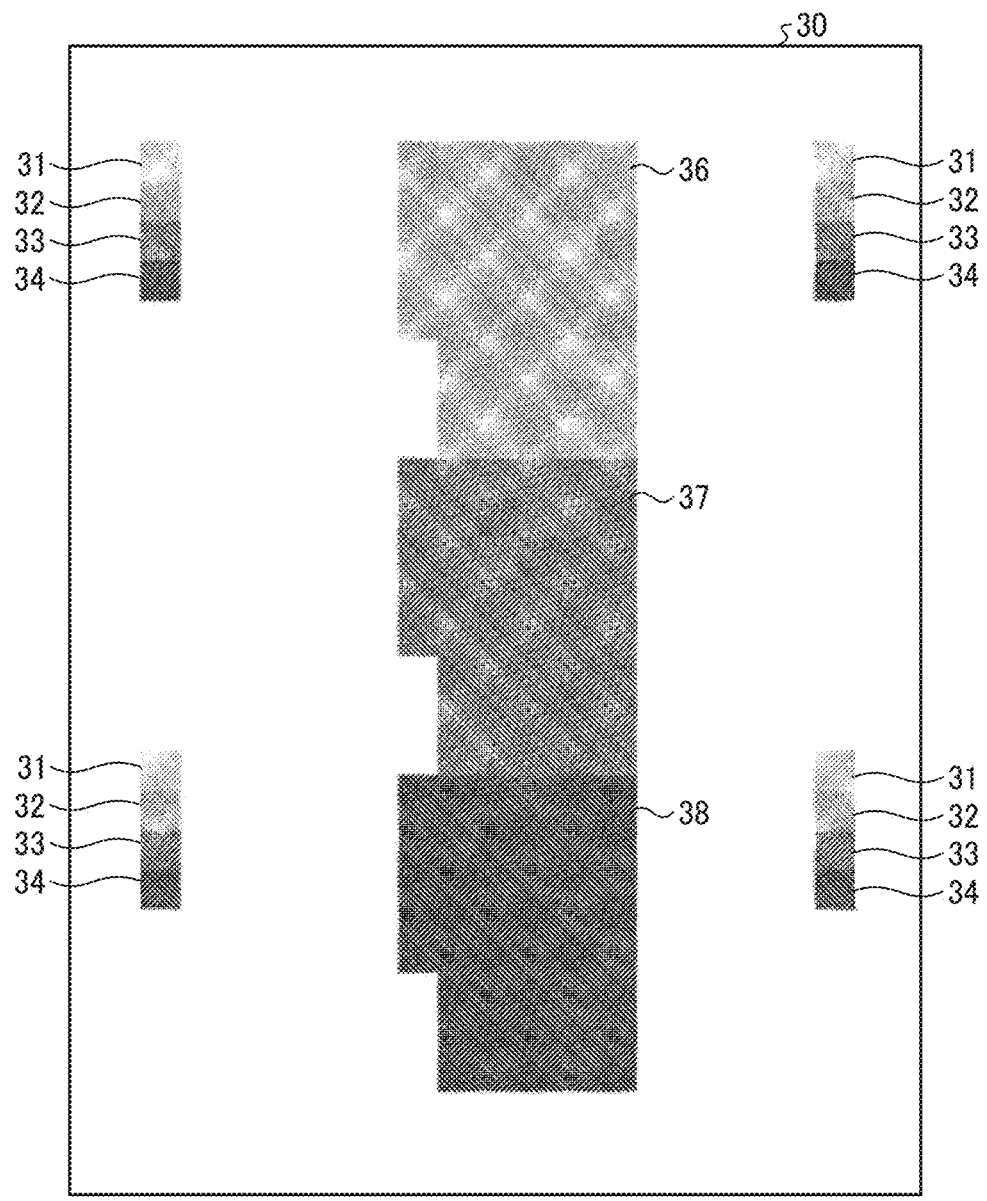
FIG. 8 illustrates an example of a gray-correction chart in a first state according to the first embodiment of the present disclosure.

FIG. 7 is a flowchart illustrating an example of a target gray acquisition process of the image processing apparatus 1 according to the first embodiment. FIG. 8 illustrates an example of a gray-correction chart in the first state according to the first embodiment. The target gray acquisition process of the image processing apparatus 1 according to this embodiment will be described with reference to FIGS. 7 and 8. The target gray acquisition process of the image processing apparatus 1 is performed in the first state described above.

Step S21

First, the chart image generation unit 16 generates a single-color calibration chart. The image data of the single-color calibration chart is subjected to image processing by the image processing unit 18 and is output from the image output unit 19 to the image forming apparatus 2. In this case, the image processing unit 18 does not perform the profile conversion process or the calibration process. That is, the image data of the single-color calibration chart is output such that the input device value (CM, Min, Yin, Kin) is equal to the output device value (Cout, Mout, Yout, Kout). Then, the image forming apparatus 2 outputs the single-color calibration chart, and the colorimeter 4 performs a color measurement process. The process then proceeds to step S22.

Step S22

Then, the colorimetric value acquisition unit 11 acquires the colorimetric values of the single-color calibration chart from the colorimeter 4. Then, the target acquisition unit 13 acquires a target single color from the colorimetric values and stores the target single color in the storage unit 14. Then, the TRC generation unit 15 generates a single-color TRC so as to match the target single color stored in the storage unit 14, and stores the single-color TRC in the storage unit 14. Since the result of the gray correction process described below is directly applied to the single-color TRC, the format of the values of the target single color and the method for generating the single-color TRC are not limited to a specific format and method. The process then proceeds to step S23.

Step S23

Then, the chart image generation unit 16 generates, for example, a gray-correction chart 30 illustrated in FIG. 8.

As illustrated in FIG. 8, the gray-correction chart 30 includes sets of patches 31 to 34 and patch groups 36 to 38. Each of the sets of patches 31 to 34 is arranged at a corresponding one of the four corners of the gray-correction chart 30. The patch 31 is a patch of a target gray having a dot area ratio of C=M=Y=10% (an example of a first gradation value). The patch 32 is a patch of a target gray having a dot area ratio of C=M=Y=20% (an example of a first gradation value). The patch 33 is a patch of a target gray having a dot area ratio of C=M=Y=40% (an example of a first gradation value). The patch 34 is a patch of a target gray having a dot area ratio of C=M=Y=60% (an example of a first gradation value). The patch group 36 is a group of patches of adjacent grays that are assigned in combinations of ±5% for C and M and ±10% for Y (an example of a second gradation value) relative to the dot area ratio of the patch 32. The patch group 37 is a group of patches of adjacent grays that are assigned in combinations of ±5% for C and M and ±10% for Y (an example of a second gradation value) relative to the dot area ratio of the patch 33. The patch group 38 is a group of patches of adjacent grays that are assigned in combinations of ±5% for C and M and ±10% for Y (an example of a second gradation value) relative to the dot area ratio of the patch 34. The patch groups 36 to 38 also include patches having the same dot area ratios as those of the patches 32 to 34, respectively. The sets of the patches 31 to 34 are not limited to being arranged at the four corners and may be arranged at positions at which the colorimetric values of the respective target grays are accurately obtained.

The image data of the gray-correction chart 30 is subjected to image processing by the image processing unit 18 and is output from the image output unit 19 to the image forming apparatus 2. In this case, the image processing unit 18 performs the calibration process without performing the profile conversion process. Then, the image forming apparatus 2 outputs the gray-correction chart 30, and the colorimeter 4 performs a color measurement process. The process then proceeds to step S24.

Step S24

Then, the colorimetric value acquisition unit 11 acquires the colorimetric values of the gray-correction chart 30 from the colorimeter 4. The prediction model creation unit 12 acquires, from among the colorimetric values described above, each of the grays of the patch group 36, each of the grays of the patch group 37, and each of the grays of the patch group 38 as a 20% target-adjacent gray, a 40% target-adjacent gray, and a 60% target-adjacent gray, respectively. The 20% target-adjacent gray, the 40% target-adjacent gray, and the 60% target-adjacent gray are examples of a second colorimetric value. Then, the prediction model creation unit 12 creates a prediction model from the 20% target-adjacent gray, for predicting a colorimetric value from a dot area ratio around 20%. This prediction model is hereinafter also referred to as a 20% prediction model. Likewise, the prediction model creation unit 12 creates a 40% prediction model from the 40% target-adjacent gray, and creates a 60% prediction model from the 60% target-adjacent gray. That is, high-gradation prediction models, namely, the 20%, 40% and 60% prediction models, are created from the target-adjacent grays acquired in the first state. The process then proceeds to step S25.

Step S25

The target acquisition unit 13 acquires the colorimetric values of the patches 31 to 34 from among the colorimetric values acquired by the colorimetric value acquisition unit 11. Then, the target acquisition unit 13 calculates an average value of the colorimetric values of the patch 31 at the four positions to acquire a 10% target gray. The target acquisition unit 13 also calculates an average value of the colorimetric values of the patch 32 at the four positions to acquire a 20% target gray. The target acquisition unit 13 also calculates an average value of the colorimetric values of the patch 33 at the four positions to acquire a 40% target gray. The target acquisition unit 13 also calculates an average value of the colorimetric values of the patch 34 at the four positions to acquire a 60% target gray. The average values are examples of a first colorimetric value. Then, the target gray acquisition process of the image processing apparatus 1 ends.

Gray Correction Process of Image Processing Apparatus

Figure 9:
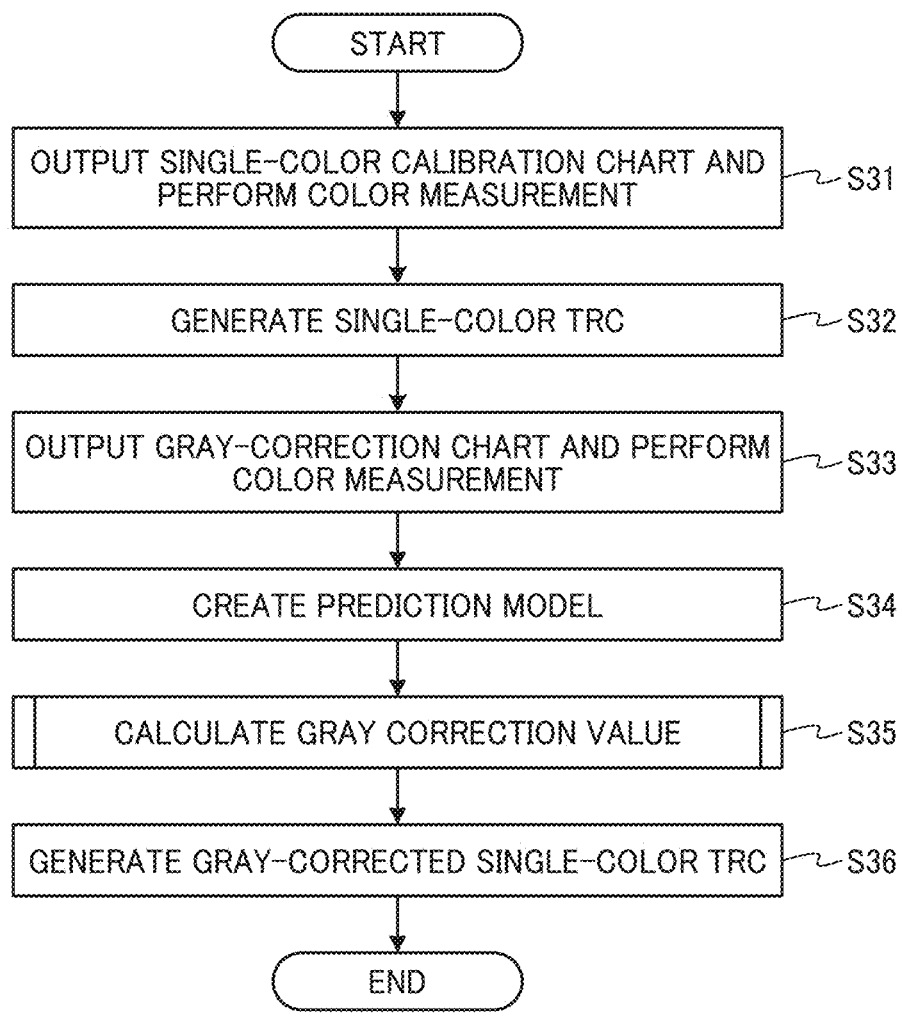
FIG. 9 is a flowchart illustrating an example of a gray correction process of the image processing apparatus according to the first embodiment of the present disclosure.
Figure 10:
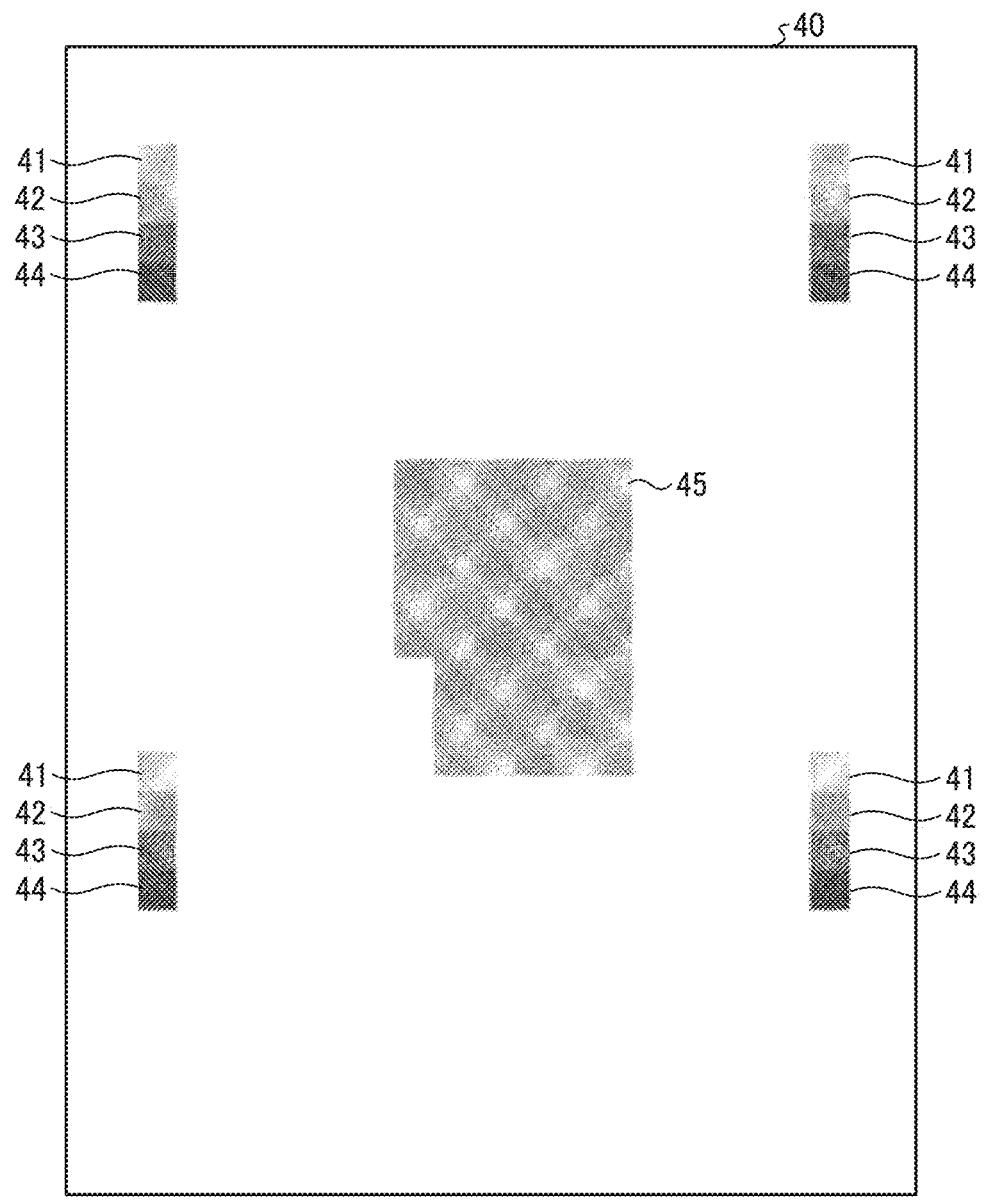
FIG. 10 illustrates an example of a gray-correction chart in a second state according to the first embodiment of the present disclosure.
Figure 11:
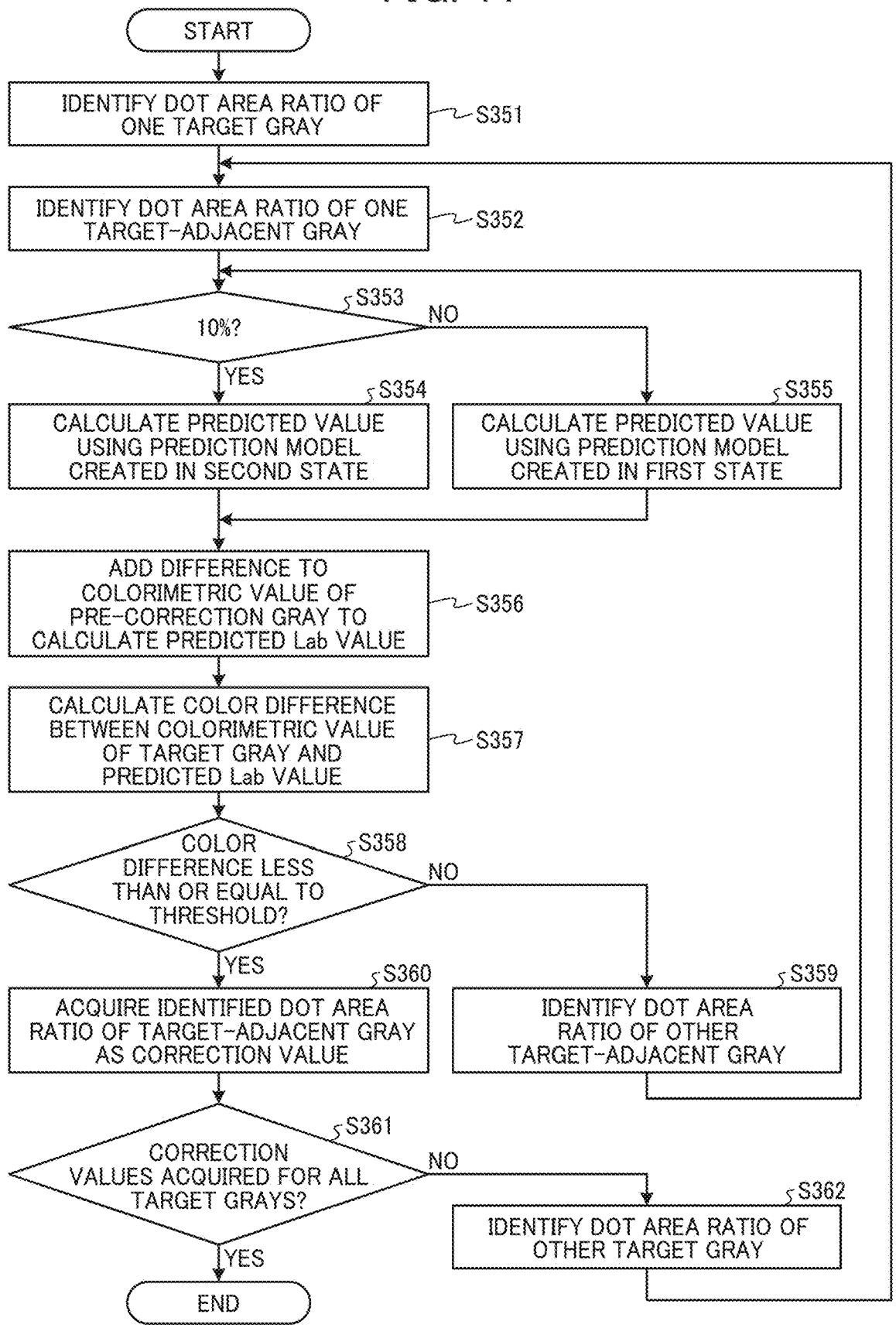
FIG. 11 is a flowchart illustrating an example of a gray correction value calculation process of the image processing apparatus according to the first embodiment of the present disclosure.
Figure 12:
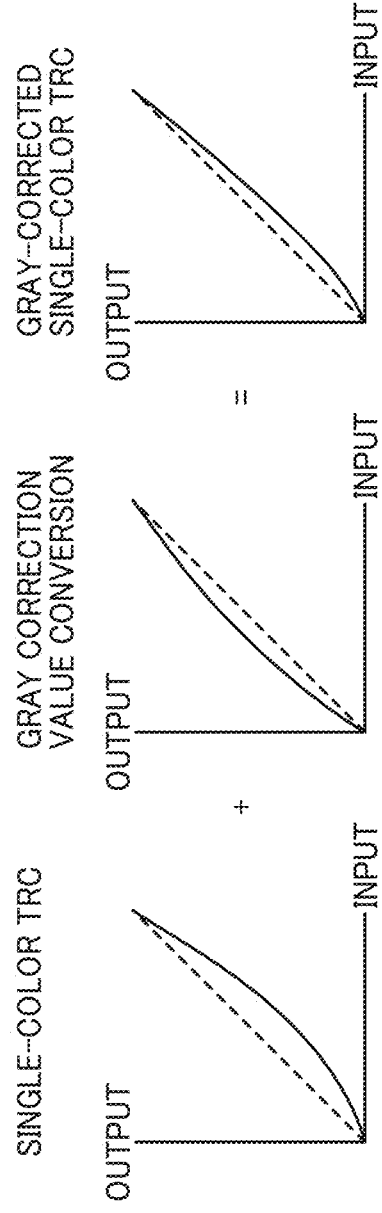
FIG. 12 illustrates a gray-correction single-color tone reproduction curve (TRC) according to the first embodiment of the present disclosure.
Figure 13:
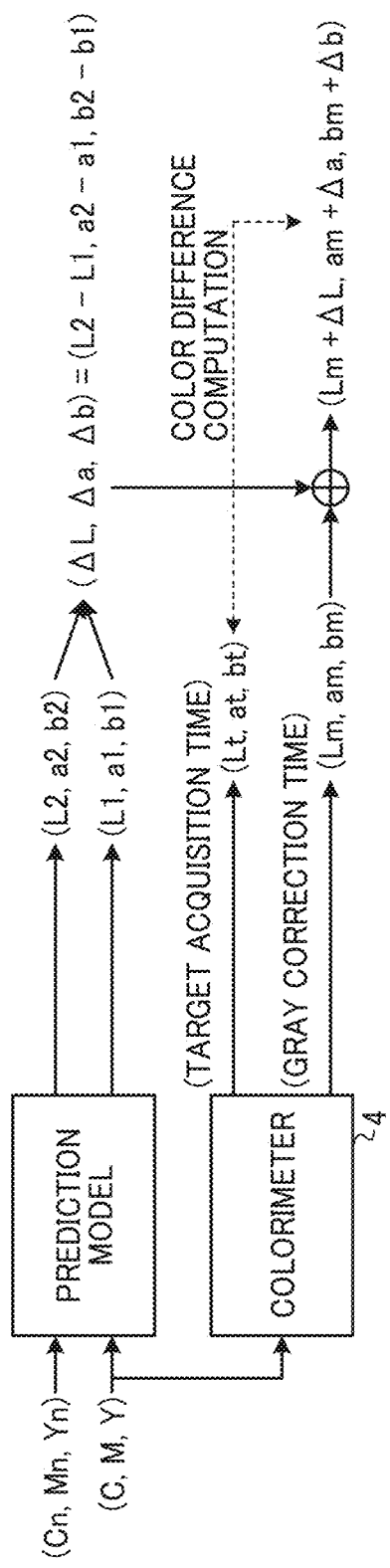
FIG. 13 illustrates a process for calculating a gray correction value in the image processing apparatus according to the first embodiment of the present disclosure.

FIG. 9 is a flowchart illustrating an example of a gray correction process of the image processing apparatus 1 according to the first embodiment. FIG. 10 illustrates an example of a gray-correction chart in the second state according to the first embodiment. FIG. 11 is a flowchart illustrating an example of a gray correction value calculation process of the image processing apparatus 1 according to the first embodiment. FIG. 12 illustrates a gray-correction single-color TRC. FIG. 13 illustrates a process for calculating a gray correction value in the image processing apparatus 1 according to the first embodiment. The gray correction process of the image processing apparatus 1 according to this embodiment will be described with reference to FIGS. 9 to 13. The gray correction process of the image processing apparatus 1 is performed in the second state described above.

Step S31

First, the chart image generation unit 16 generates a single-color calibration chart. The image data of the single-color calibration chart is subjected to image processing by the image processing unit 18 and is output from the image output unit 19 to the image forming apparatus 2. In this case, the image processing unit 18 does not perform the profile conversion process or the calibration process. That is, the image data of the single-color calibration chart is output such that the input device value (CM, Min, Yin, Kin) is equal to the output device value (Cout, Mout, Yout, Kout). Then, the image forming apparatus 2 outputs the single-color calibration chart, and the colorimeter 4 performs a color measurement process. The process then proceeds to step S32.

Step S32

Then, the colorimetric value acquisition unit 11 acquires the colorimetric values of the single-color calibration chart from the colorimeter 4. Then, the target acquisition unit 13 acquires a target single color from the colorimetric values and stores the target single color in the storage unit 14. Then, the TRC generation unit 15 generates a single-color TRC so as to match the target single color stored in the storage unit 14, and updates the single-color TRC stored in the storage unit 14 with the generated single-color TRC. The process then proceeds to step S33.

Step S33

Then, the chart image generation unit 16 generates, for example, a gray-correction chart 40 illustrated in FIG. 10.

As illustrated in FIG. 10, the gray-correction chart 40 includes sets of patches 41 to 44 and a patch group 45. Each of the sets of patches 41 to 44 is arranged at a corresponding one of the four corners of the gray-correction chart 40. The patch 41 is a patch of a pre-correction gray having a dot area ratio of C=M=Y=10% (an example of a first gradation value). The patch 42 is a patch of a pre-correction gray having a dot area ratio of C=M=Y=20% (an example of a first gradation value). The patch 43 is a patch of a pre-correction gray having a dot area ratio of C=M=Y=40% (an example of a first gradation value). The patch 44 is a patch of a pre-correction gray having a dot area ratio of C=M=Y=60% (an example of a first gradation value). The patch group 45 is a group of patches of adjacent grays that are assigned in combinations of ±5% for C and M and ±10% for Y (an example of a second gradation value) relative to the dot area ratio of the patch 41. The patch group 45 also includes a patch having the same dot area ratio as that of the patch 41. The sets of the patches 41 to 44 are not limited to being arranged at the four corners and may be arranged at positions at which the colorimetric values of the respective pre-correction grays are accurately obtained.

The image data of the gray-correction chart 40 is subjected to image processing by the image processing unit 18 and is output from the image output unit 19 to the image forming apparatus 2. In this case, the image processing unit 18 performs the calibration process by using the single-color TRC in step S32 without performing the profile conversion process. Then, the image forming apparatus 2 outputs the gray-correction chart 40, and the colorimeter 4 performs a color measurement process. The process then proceeds to step S34.

Step S34

Then, the colorimetric value acquisition unit 11 acquires the colorimetric values of the gray-correction chart 40 from the colorimeter 4. The prediction model creation unit 12 acquires, from among the colorimetric values described above, each of the grays of the patch group 45 as a 10% target-adjacent gray. The 10% target-adjacent gray is an example of a second colorimetric value. Then, the prediction model creation unit 12 creates a prediction model from the 10% target-adjacent gray, for predicting a colorimetric value from a dot area ratio around 10%. This prediction model is hereinafter also referred to as a 10% prediction model. That is, a low-gradation prediction model, namely, the 10% prediction model, is created from a target-adjacent gray acquired in the second state. The process then proceeds to step S35.

Step S35

The TRC generation unit 15 acquires the colorimetric values of the patches 41 to 44 from among the colorimetric values acquired by the colorimetric value acquisition unit 11. Then, the TRC generation unit 15 calculates an average value of the colorimetric values of the patch 41 at the four positions to acquire a 10% pre-correction gray. The TRC generation unit 15 also calculates an average value of the colorimetric values of the patch 42 at the four positions to acquire a 20% pre-correction gray. The TRC generation unit 15 also calculates an average value of the colorimetric values of the patch 43 at the four positions to acquire a 40% pre-correction gray. The TRC generation unit 15 also calculates an average value of the colorimetric values of the patch 44 at the four positions to acquire a 60% pre-correction gray. The 10% pre-correction gray, the 20% pre-correction gray, the 40% pre-correction gray, and the 60% pre-correction gray are examples of a third colorimetric value. Then, the TRC generation unit 15 acquires, for the dot area ratio of each pre-correction gray, a correction value so as to match the corresponding target gray by using the corresponding prediction model. The details of the gray correction value calculation process, which is a process for calculating a correction value by using the TRC generation unit 15, will be described hereinafter with reference to FIGS. 11 to 13.

Step S351

First, the TRC generation unit 15 identifies the dot area ratio (C, M, Y) of one of the target grays for calculating a correction value. The process then proceeds to step S352.

Step S352

Then, the TRC generation unit 15 identifies the dot area ratio (Cn, Mn, Yn) of one target-adjacent gray among the dot area ratios of the target-adjacent grays corresponding to the identified dot area ratio of the target gray. The process then proceeds to step S353.

Step S353

Then, the TRC generation unit 15 determines whether the identified dot area ratio (Cn, Mn, Yn) of the target-adjacent gray is equal to the dot area ratio of the 10% target-adjacent gray. If the identified dot area ratio (Cn, Mn, Yn) of the target-adjacent gray is equal to the dot area ratio of the 10% target-adjacent gray (step S353: Yes), the process proceeds to step S354. If the identified dot area ratio (Cn, Mn, Yn) of the target-adjacent gray is equal to the dot area ratio of any one of the target-adjacent grays other than the 10% target-adjacent gray (here, the 20%, 40%, or 60% target-adjacent gray) (step S353: No), the process proceeds to step S355.

Step S354

The TRC generation unit 15 calculates the predicted values (L1, a1, b1) from the identified dot area ratio (C, M, Y) of the target gray (here, the 10% target gray) by using the prediction model created in the first state (here, the 10% prediction model). Further, the TRC generation unit 15 calculates the predicted values (L2, a2, b2) from the identified dot area ratio (Cn, Mn, Yn) of the target-adjacent gray (here, the 10% target-adjacent gray) by using the prediction model created in the second state (here, the 10% prediction model). The process then proceeds to step S356.

Step S355

The TRC generation unit 15 calculates the predicted values (L1, a1, b1) from the identified dot area ratio (C, M, Y) of the target gray (here, the 20%, 40%, or 60% target gray) by using the prediction model created in the first state. Further, the TRC generation unit 15 calculates the predicted values (L2, a2, b2) from the identified dot area ratio (Cn, Mn, Yn) of the target-adjacent gray (here, the 20%, 40%, or 60% target-adjacent gray) by using the prediction model created in the second state. The process then proceeds to step S356.

Step S356

Then, as illustrated in FIG. 13, the TRC generation unit 15 adds the difference (ΔL, Δa, Δb) between the predicted values (L1, a1, b1) and the predicted values (L2, a2, b2), which is given by (ΔL, Δa, Δb)=(L2−L1, a2−a1, b2−b1), to the pre-correction gray (Lm, am, bm) corresponding to the identified dot area ratio of the target gray among the acquired pre-correction grays to calculate predicted Lab values (Lm+ΔL, am+Δa, bm+Δb) (predicted colorimetric values). The process then proceeds to step S357.

Step S357

Then, as illustrated in FIG. 13, the TRC generation unit 15 calculates the color difference between the calculated predicted Lab values and the colorimetric values (Lt, at, bt) of the target gray corresponding to the identified dot area ratio of the target gray. The process then proceeds to step S358.

Step S358

The TRC generation unit 15 determines whether the calculated color difference is less than or equal to a predetermined threshold (first threshold). If the color difference is less than or equal to the threshold (step S358: Yes), the process proceeds to step S360. If the color difference exceeds the threshold (step S358: No), the process proceeds to step S359.

Step S359

The TRC generation unit 15 identifies the dot area ratio (Cn, Mn, Yn) of another target-adjacent gray different from the identified dot area ratio of the target-adjacent gray among the dot area ratios of the target-adjacent grays corresponding to the identified dot area ratio of the target gray. The process then returns to step S353.

Step S360

The TRC generation unit 15 acquires the identified dot area ratio of the target-adjacent gray as a correction value that takes into account the gray relative to the identified dot area ratio of the target gray. The process then proceeds to step S361.

Step S361

The TRC generation unit 15 determines whether correction values for the dot area ratios of all of the target grays have been acquired. If correction values for the dot area ratios of all of the target grays have not been acquired (step S361: No), the process proceeds to step S362. If correction values for the dot area ratios of all of the target grays have been acquired (step S361: Yes), the gray correction value calculation process ends, and then the process proceeds to step S36 in FIG. 9.

Step S362

The TRC generation unit 15 identifies the dot area ratio (C, M, Y) of another target gray different from the identified dot area ratio of the target gray among all of the target grays. The process then returns to step S352.

Step S36

Then, the TRC generation unit 15 reflects a correction based on the calculated correction values (the gray correction value conversion illustrated in FIG. 12) in the single-color TRC obtained in step S32 to generate a single-color TRC (gray-corrected single-color TRC). Then, the TRC generation unit 15 updates the single-color TRC stored in the storage unit 14 with the generated single-color TRC.

After that, the image processing unit 18 executes a calibration process by using the single-color TRC (gray-corrected single-color TRC) to perform gray correction on the input device value to obtain an output device value. Then, the gray correction process of the image processing apparatus 1 ends.

As described above, the configuration of the image processing apparatus 1 according to this embodiment makes it possible to accurately correct color mixtures while keeping the load of a color measurement process low for each correction.

In the foregoing description, a prediction model for the 10% target-adjacent gray is created at the gray correction time (i.e., the second state). In an alternative example, a prediction model for a target-adjacent gray having another dot area ratio may be created at the gray correction time (i.e., the second state). For example, a prediction model for the 20% target-adjacent gray, which is approximately a low-gradation target-adjacent gray, may be created at the gray correction time (i.e., the second state).

Second Embodiment

An image processing apparatus according to a second embodiment will be described focusing on differences from the image processing apparatus 1 according to the first embodiment. This embodiment describes an operation of updating a prediction model created at the target gray acquisition time (i.e., the first state). Specifically, a local variation difference between the target gray acquisition time (i.e., the first state) and the gray correction time (i.e., the second state) is evaluated such that a prediction model for a target-adjacent gray for which the local variation difference is greater than or equal to a predetermined threshold is updated with a prediction model created at the gray correction time. The general arrangement of an information processing system 100 according to this embodiment, and the hardware configurations of an image processing apparatus, namely, an image processing apparatus 1a described below, an image forming apparatus 2, and a user PC 3 according to this embodiment are similar to those described in the first embodiment.

Configuration and Operation of Functional Blocks of Image Processing Apparatus

Figure 14:
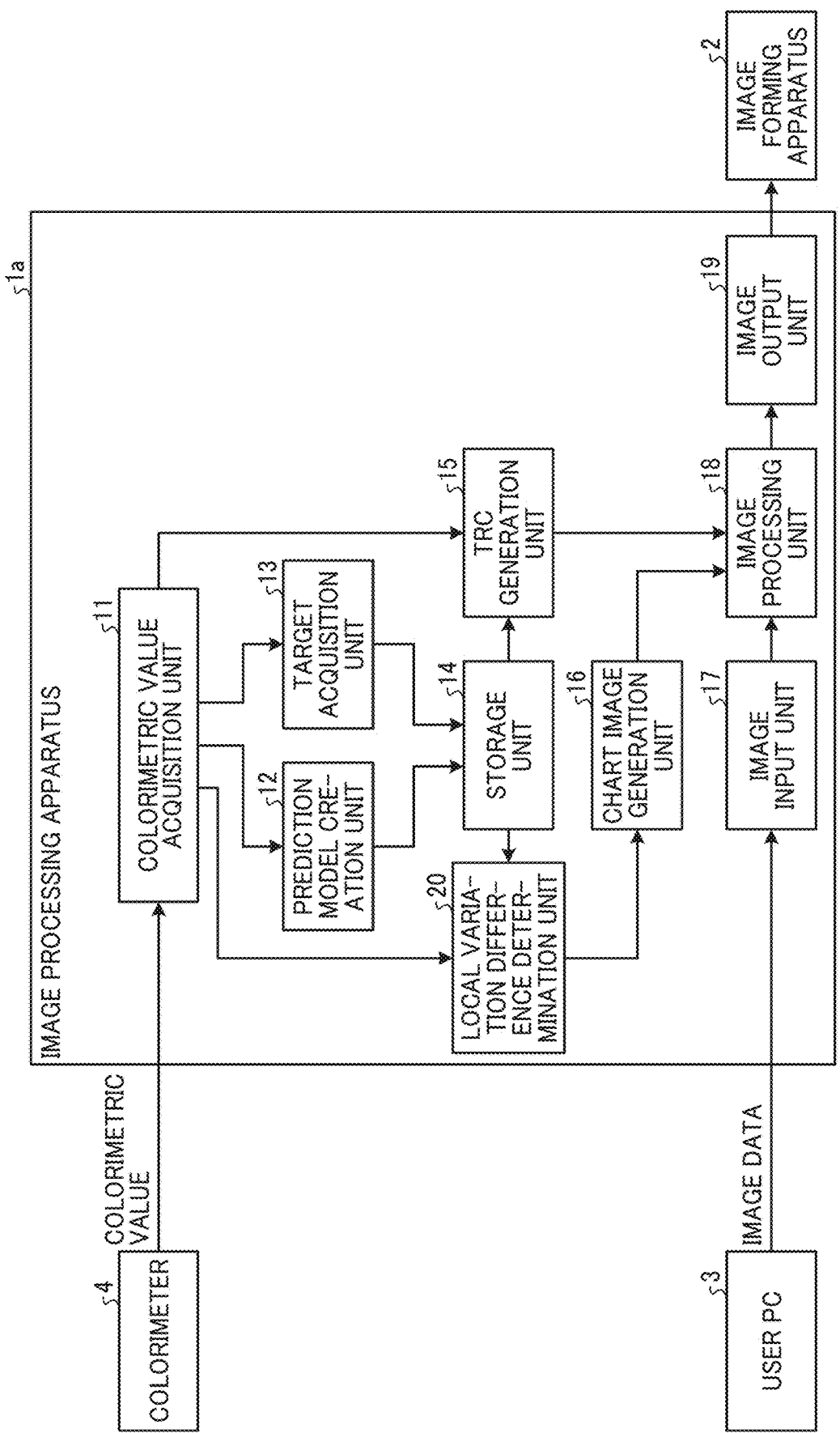
FIG. 14 is a diagram illustrating an example configuration of functional blocks of an image processing apparatus according to a second embodiment of the present disclosure.

FIG. 14 is a diagram illustrating an example configuration of functional blocks of the image processing apparatus 1a according to the second embodiment. The configuration and operation of the functional blocks of the image processing apparatus 1a according to this embodiment will be described with reference to FIG. 14.

As illustrated in FIG. 14, the image processing apparatus 1a includes a colorimetric value acquisition unit 11, a prediction model creation unit 12 (second acquisition unit, creation unit), a target acquisition unit 13 (first acquisition unit), a storage unit 14, a TRC generation unit 15 (third acquisition unit, first calculation unit, first determination unit, fourth acquisition unit), a chart image generation unit 16, an image input unit 17, an image processing unit 18 (correction unit), an image output unit 19, and a local variation difference determination unit 20 (second calculation unit, second determination unit). The operations of the colorimetric value acquisition unit 11, the prediction model creation unit 12, the target acquisition unit 13, the storage unit 14, the TRC generation unit 15, the image input unit 17, the image processing unit 18, and the image output unit 19 are similar to those described in the first embodiment.

The chart image generation unit 16 is a functional unit that generates a chart image. The chart image is used to acquire target grays, create prediction models, determine local variation differences, and perform a gray correction process.

The local variation difference determination unit 20 is a functional unit that calculates a local variation difference from the colorimetric values acquired by the colorimetric value acquisition unit 11 and the prediction models stored in the storage unit 14 and performs threshold determination on the local variation difference. The local variation difference determination unit 20 is implemented by, for example, the CPU 501 illustrated in FIG. 2 executing a program.

The colorimetric value acquisition unit 11, the prediction model creation unit 12, the target acquisition unit 13, the TRC generation unit 15, the chart image generation unit 16, the image input unit 17, the image processing unit 18, the image output unit 19, and the local variation difference determination unit 20 of the image processing apparatus 1a illustrated in FIG. 14 are not limited to being implemented by the CPU 501 illustrated in FIG. 2 executing a program. For example, the colorimetric value acquisition unit 11, the prediction model creation unit 12, the target acquisition unit 13, the TRC generation unit 15, the chart image generation unit 16, the image input unit 17, the image processing unit 18, the image output unit 19, and the local variation difference determination unit 20 of the image processing apparatus 1*a* illustrated in FIG. 14 may be implemented by hardware such as integrated circuits or by a combination of software and hardware.

The functional units of the image processing apparatus 1*a* illustrated in FIG. 14 are conceptually illustrated functions and are not limited to the illustrated components. For example, a plurality of functional units that are illustrated as independent functional units of the image processing apparatus 1*a* illustrated in FIG. 14 may be combined into one functional unit. Alternatively, a function of one of the functional units of the image processing apparatus 1*a* illustrated in FIG. 14 may be divided into a plurality of functions to form a plurality of functional units.

Overview of Local Variation Difference Calculation Process

Figure 15:
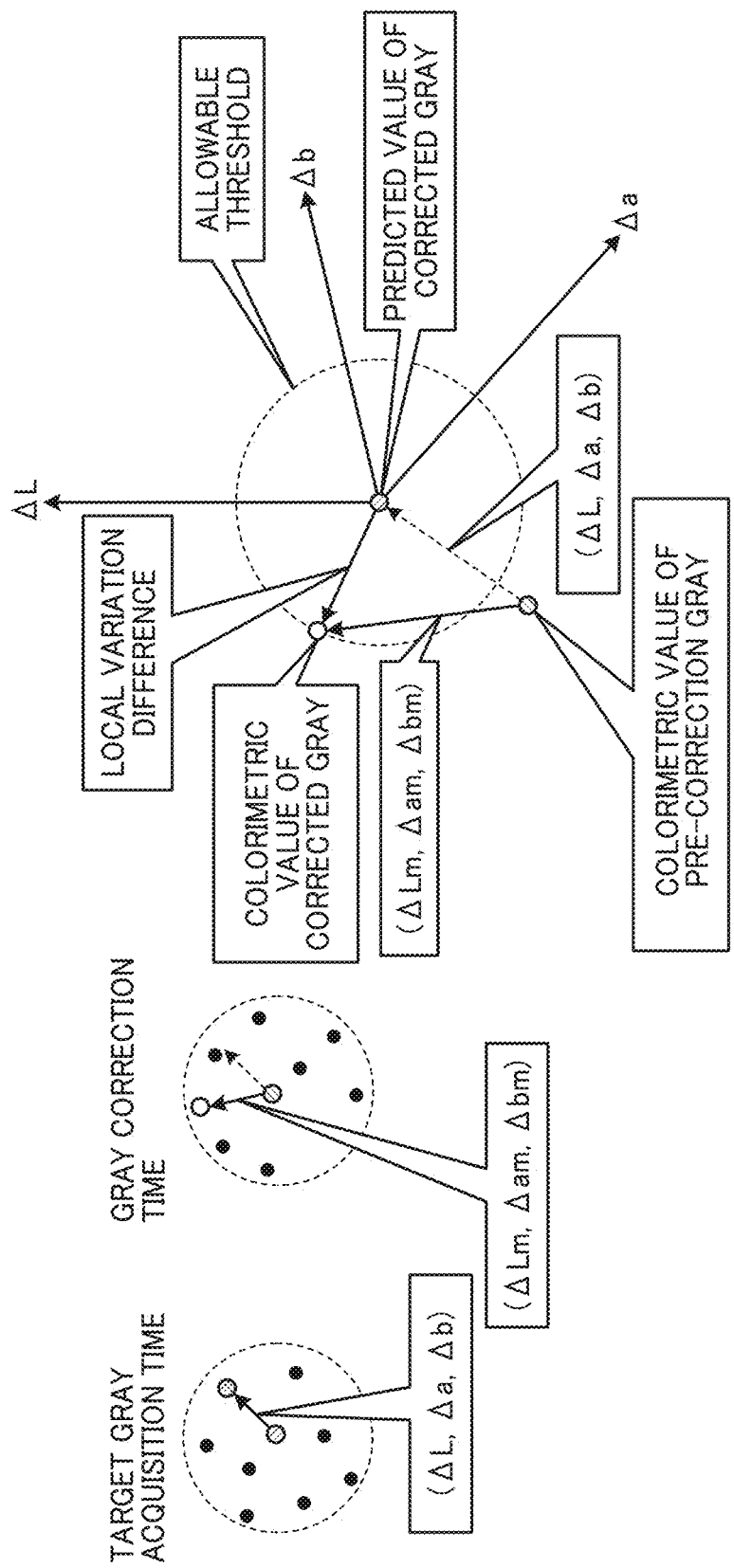
FIG. 15 is a view illustrating an overview of a local variation difference calculation process of the image processing apparatus according to the second embodiment of the present disclosure.

FIG. 15 is a view illustrating an overview of a local variation difference calculation process of the image processing apparatus 1*a* according to the second embodiment. An overview of the local variation difference calculation process of the image processing apparatus 1*a* according to this embodiment will be described with reference to FIG. 15.

A color change (local variation) between the gradation of a target gray and the gradation of a gray adjacent to the target gray (i.e., a target-adjacent gray) can be accurately corrected even by using a prediction model created at the target gray acquisition time (i.e., the first state) if the change (local variation difference) between the target gray acquisition time (i.e., the first state) and the gray correction time (i.e., the second state) is not large. Actually, however, the local variation may differ between the target gray acquisition time and the gray correction time due to a factor such as a change in the state of the image forming apparatus 2. For this reason, as illustrated in FIG. 15, if a correction value calculated by using a prediction model created at the target gray acquisition time (i.e., the first state) is applied, the colorimetric values of the corrected gray fail to match the predicted values of the corrected gray. In this manner, a large local variation difference between the target gray acquisition time and the gray correction time leads to low correction accuracy. In this embodiment, accordingly, a prediction model created at the gray correction time (i.e., the second state) is used for a large local variation difference, and a prediction model created at the target gray acquisition time (i.e., the first state) is used otherwise.

Target Gray Acquisition Process of Image Processing Apparatus

Figure 16:
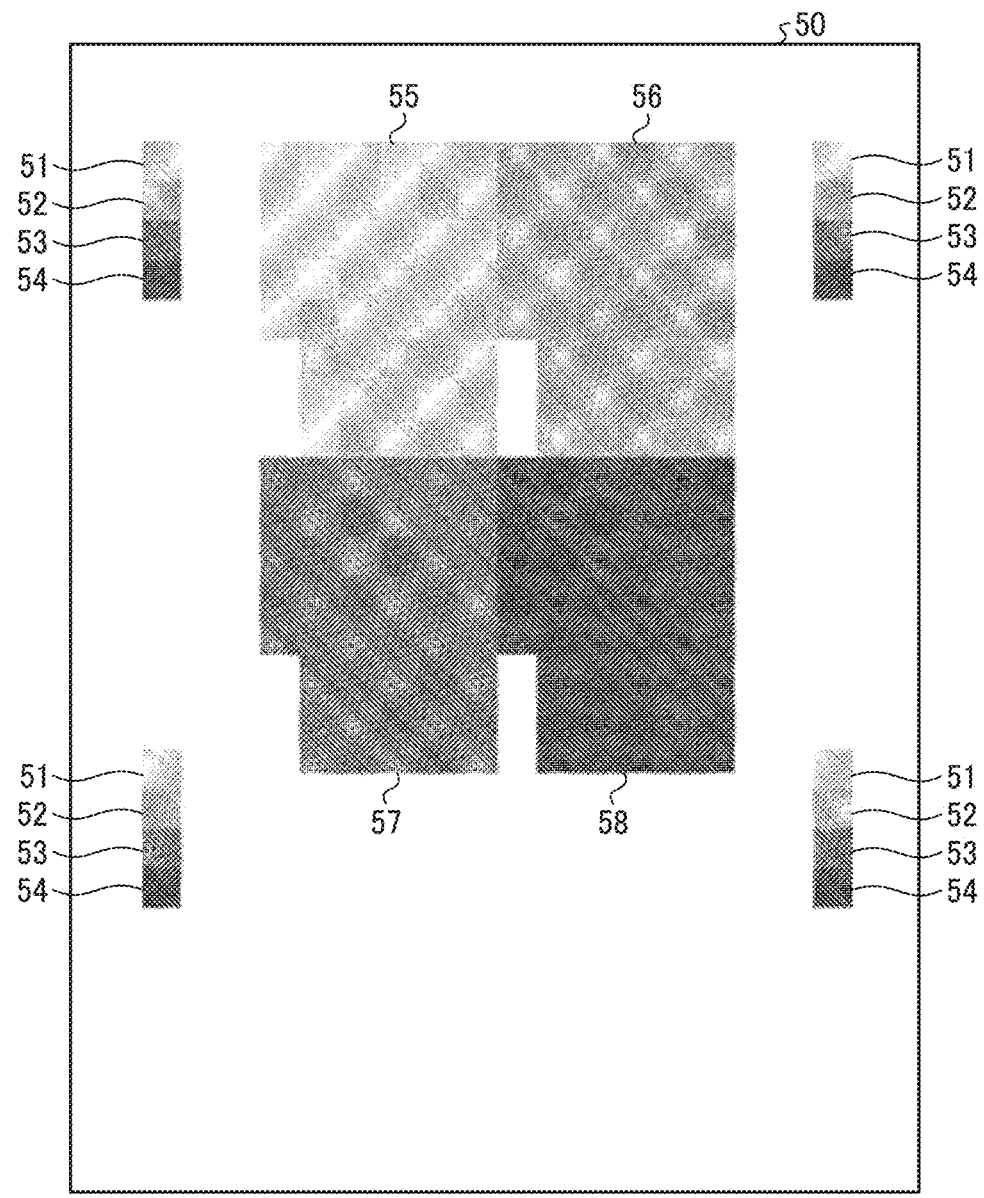
FIG. 16 illustrates an example of a gray-correction chart in a first state according to the second embodiment of the present disclosure.

FIG. 16 illustrates an example of a gray-correction chart in the first state according to the second embodiment. The target gray acquisition process of the image processing apparatus 1*a* according to this embodiment is performed in accordance with the flowchart illustrated in FIG. 7 described above. Differences from the target gray acquisition process described above will be mainly described.

In step S23, the chart image generation unit 16 generates, for example, a gray-correction chart 50 illustrated in FIG. 16.

As illustrated in FIG. 16, the gray-correction chart 50 includes sets of patches 51 to 54 and patch groups 55 to 58. Each of the sets of patches 51 to 54 is arranged at a corresponding one of the four corners of the gray-correction chart 50. The patch 51 is a patch of a target gray having a dot area ratio of C=M=Y=10% (an example of a first gradation value). The patch 52 is a patch of a target gray having a dot area ratio of C=M=Y=20% (an example of a first gradation value). The patch 53 is a patch of a target gray having a dot area ratio of C=M=Y=40% (an example of a first gradation value). The patch 54 is a patch of a target gray having a dot area ratio of C=M=Y=60% (an example of a first gradation value). The patch group 55 is a group of patches of adjacent grays that are assigned in combinations of ±5% for C and M and ±10% for Y (an example of a second gradation value) relative to the dot area ratio of the patch 51. The patch group 56 is a group of patches of adjacent grays that are assigned in combinations of ±5% for C and M and ±10% for Y (an example of a second gradation value) relative to the dot area ratio of the patch 52. The patch group 57 is a group of patches of adjacent grays that are assigned in combinations of ±5% for C and M and ±10% for Y (an example of a second gradation value) relative to the dot area ratio of the patch 53. The patch group 58 is a group of patches of adjacent grays that are assigned in combinations of ±5% for C and M and ±10% for Y (an example of a second gradation value) relative to the dot area ratio of the patch 54. The patch groups 55 to 58 also include patches having the same dot area ratios as those of the patches 51 to 54, respectively. The sets of the patches 51 to 54 are not limited to being arranged at the four corners and may be arranged at positions at which the colorimetric values of the respective target grays are accurately obtained.

The image data of the gray-correction chart 50 is subjected to image processing by the image processing unit 18 and is output from the image output unit 19 to the image forming apparatus 2. In this case, the image processing unit 18 performs the calibration process without performing the profile conversion process. Then, the image forming apparatus 2 outputs the gray-correction chart 50, and the colorimeter 4 performs a color measurement process.

In step S24, the colorimetric value acquisition unit 11 acquires the colorimetric values of the gray-correction chart 50 from the colorimeter 4. The prediction model creation unit 12 acquires, from among the colorimetric values described above, each of the grays of the patch group 55, each of the grays of the patch group 56, each of the grays of the patch group 57, and each of the grays of the patch group 58 as a 10% target-adjacent gray, a 20% target-adjacent gray, a 40% target-adjacent gray, and a 60% target-adjacent gray, respectively. The 10% target-adjacent gray, the 20% target-adjacent gray, the 40% target-adjacent gray, and the 60% target-adjacent gray are examples of a second colorimetric value. Then, the prediction model creation unit 12 creates a prediction model from the 10% target-adjacent gray, for predicting a colorimetric value from a dot area ratio around 10%. This prediction model is a 10% prediction model, and is an example of a first prediction model. Likewise, the prediction model creation unit 12 creates a 20% prediction model from the 20% target-adjacent gray, creates a 40% prediction model from the 40% target-adjacent gray, and creates a 60% prediction model from the 60% target-adjacent gray. The 20% prediction model, the 40% prediction model, and the 60% prediction model are examples of a first prediction model.

The other operations are similar to the operations described with reference to FIG. 7.

Gray Correction Process of Image Processing Apparatus

Figure 17:
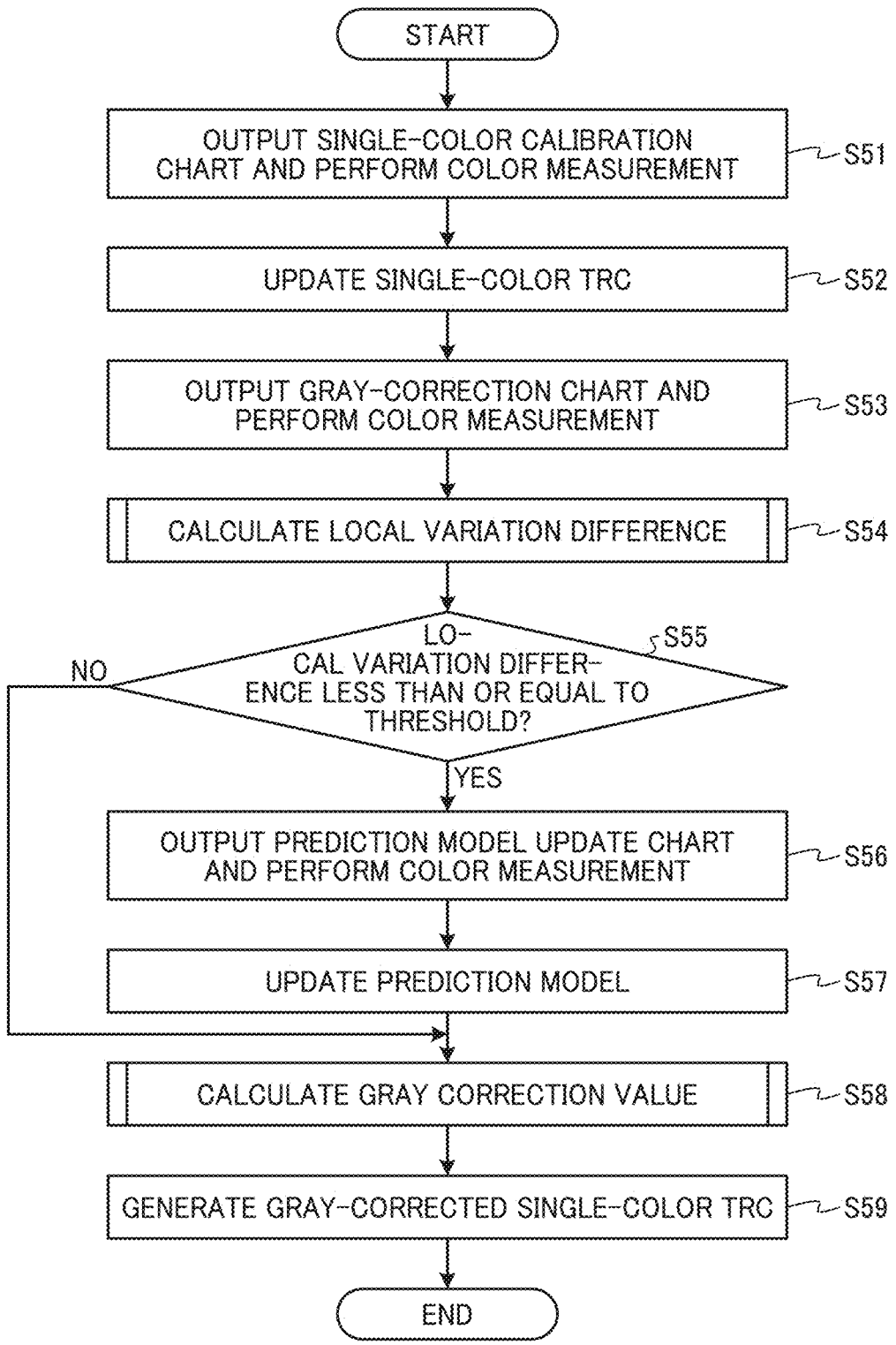
FIG. 17 is a flowchart illustrating an example of a gray correction process of the image processing apparatus according to the second embodiment of the present disclosure.
Figure 18:
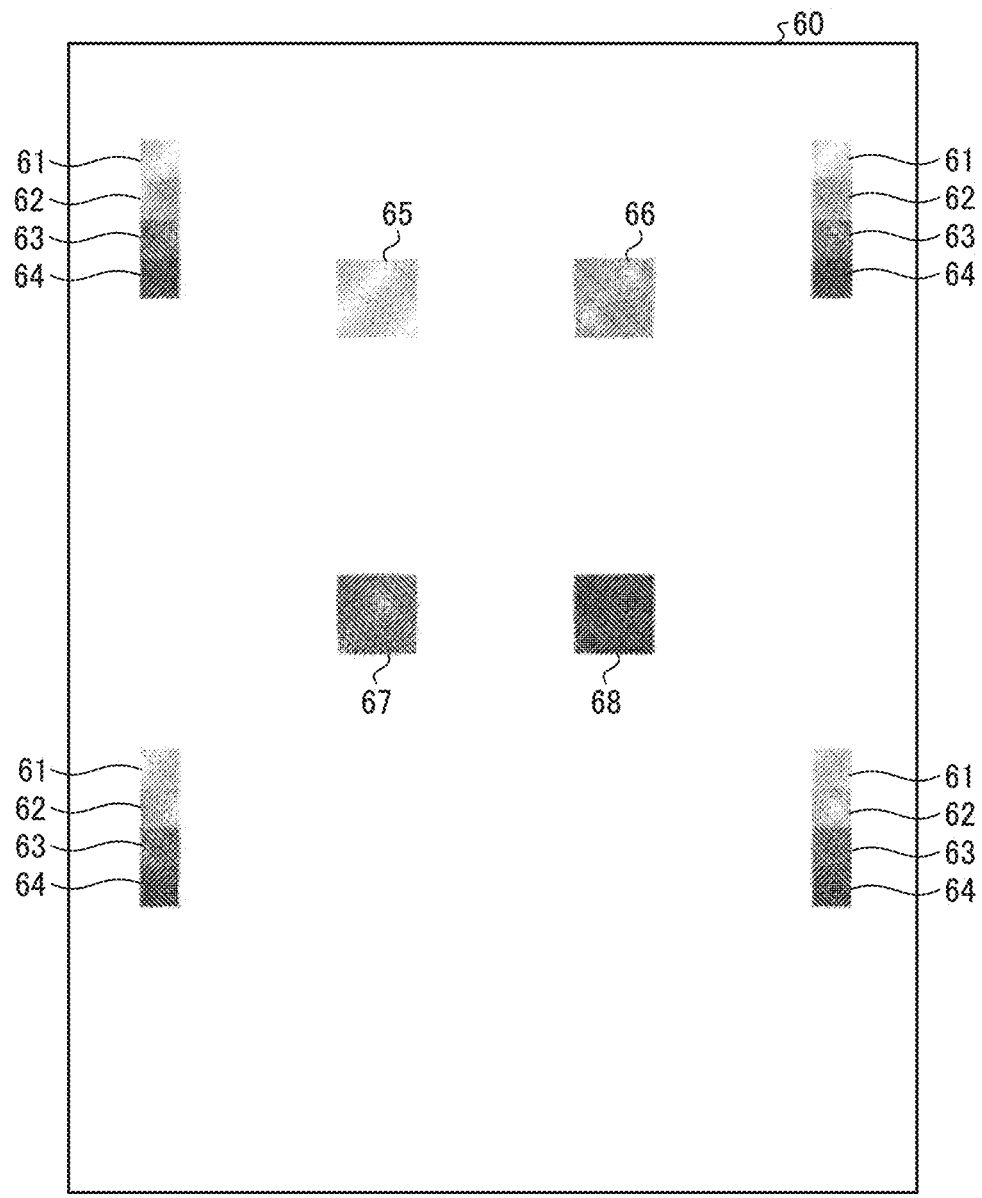
FIG. 18 illustrates an example of a gray-correction chart in a second state according to the second embodiment of the present disclosure.
Figure 19:
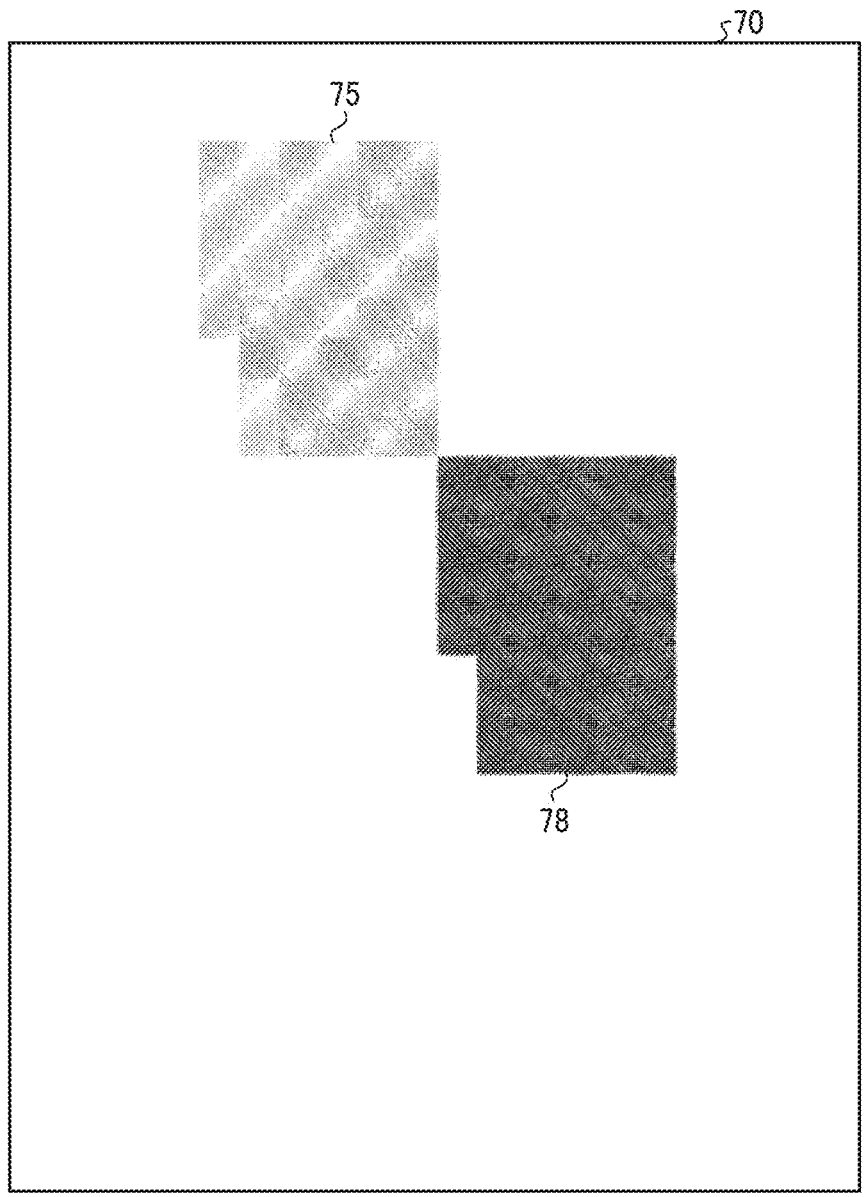
FIG. 19 illustrates an example of a prediction model update chart according to the second embodiment of the present disclosure.
Figure 20:
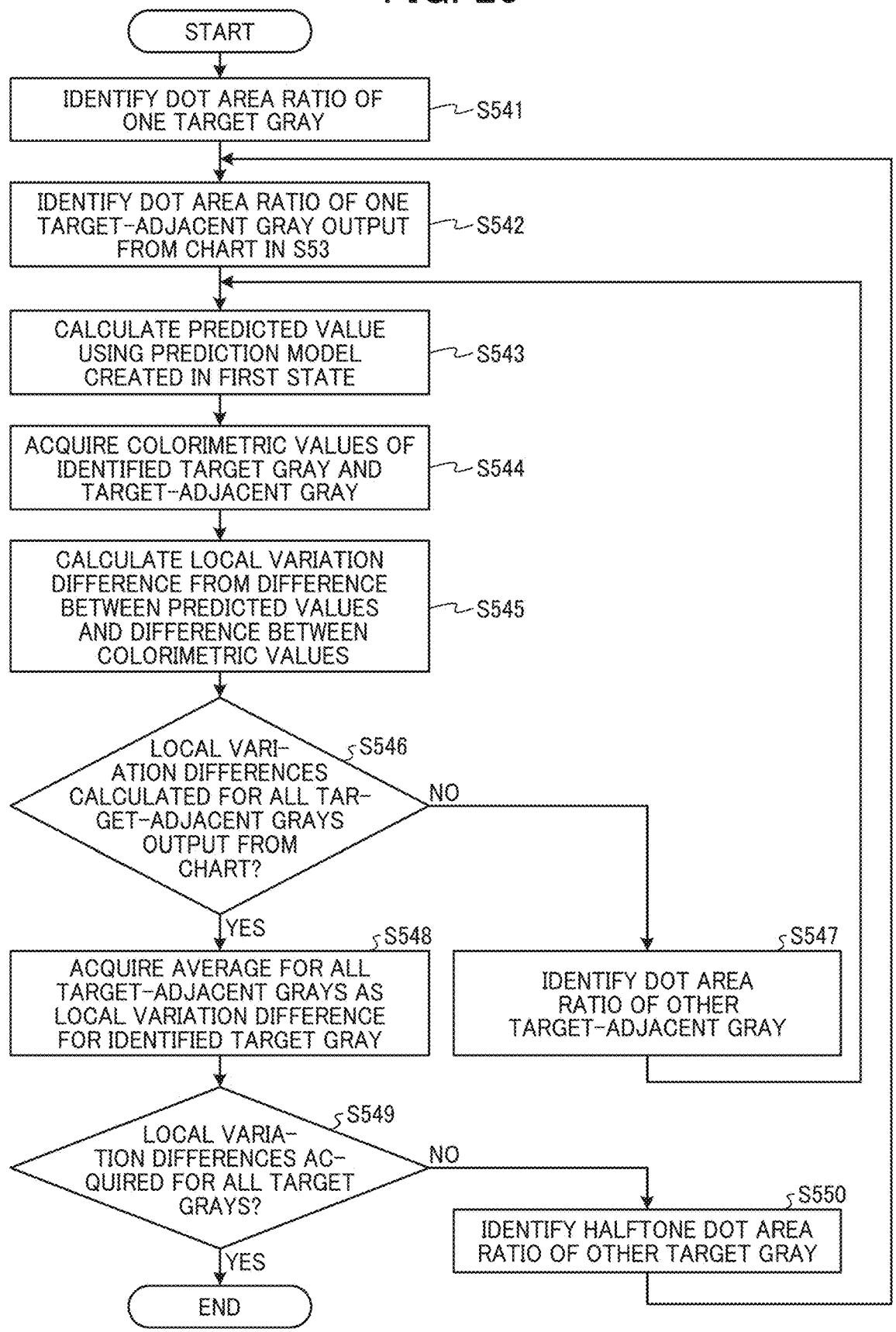
FIG. 20 is a flowchart illustrating an example of the local variation difference calculation process of the image processing apparatus according to the second embodiment of the present disclosure.
Figure 21:
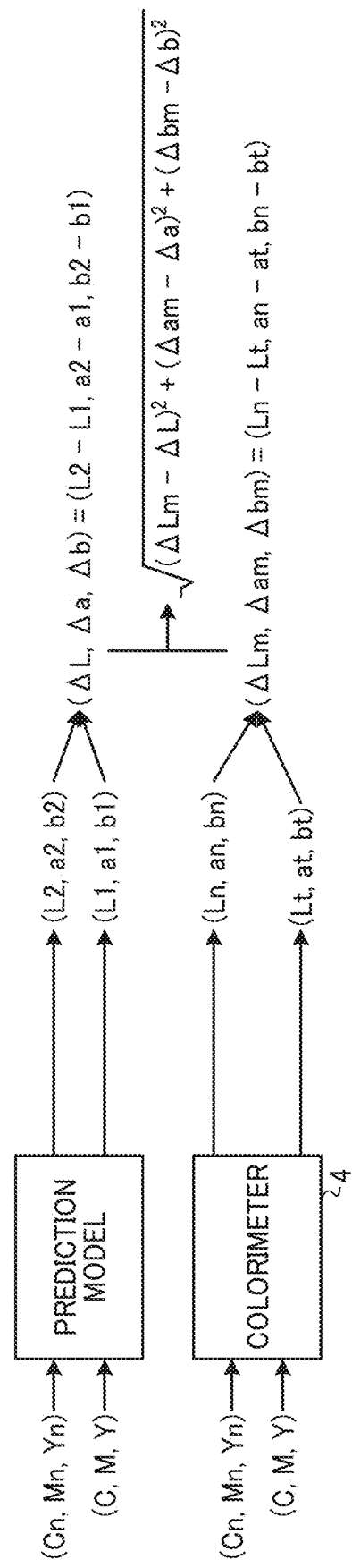
FIG. 21 illustrates a process for calculating a local variation difference in the image processing apparatus according to the second embodiment of the present disclosure.

FIG. 17 is a flowchart illustrating an example of a gray correction process of the image processing apparatus 1*a* according to the second embodiment. FIG. 18 illustrates an example of a gray-correction chart in the second state according to the second embodiment. FIG. 19 illustrates an example of a prediction model update chart according to the second embodiment. FIG. 20 is a flowchart illustrating an example of the local variation difference calculation process of the image processing apparatus 1*a* according to the second embodiment. FIG. 21 illustrates a process for calculating a local variation difference in the image processing apparatus 1a according to the second embodiment. The gray correction process of the image processing apparatus 1a according to this embodiment will be described with reference to FIGS. 17 to 21. The gray correction process of the image processing apparatus 1a is performed in the second state described above.

Step S51

First, the chart image generation unit 16 generates a single-color calibration chart. The image data of the single-color calibration chart is subjected to image processing by the image processing unit 18 and is output from the image output unit 19 to the image forming apparatus 2. In this case, the image processing unit 18 does not perform the profile conversion process or the calibration process. That is, the image data of the single-color calibration chart is output such that the input device value (CM, Min, Yin, Kin) is equal to the output device value (Cout, Mout, Yout, Kout). Then, the image forming apparatus 2 outputs the single-color calibration chart, and the colorimeter 4 performs a color measurement process. The process then proceeds to step S52.

Step S52

Then, the colorimetric value acquisition unit 11 acquires the colorimetric values of the single-color calibration chart from the colorimeter 4. Then, the target acquisition unit 13 acquires a target single color from the colorimetric values and stores the target single color in the storage unit 14. Then, the TRC generation unit 15 generates a single-color TRC so as to match the target single color stored in the storage unit 14, and updates the single-color TRC stored in the storage unit 14 with the generated single-color TRC. The process then proceeds to step S53.

Step S53

Then, the chart image generation unit 16 generates, for example, a gray-correction chart 60 illustrated in FIG. 18. As illustrated in FIG. 18, the gray-correction chart 60 includes sets of patches 61 to 64 and patch groups 65 to 68. Each of the sets of patches 61 to 64 is arranged at a corresponding one of the four corners of the gray-correction chart 60. The patch 61 is a patch of a pre-correction gray having a dot area ratio of C=M=Y=10% (an example of a first gradation value). The patch 62 is a patch of a pre-correction gray having a dot area ratio of C=M=Y=20% (an example of a first gradation value). The patch 63 is a patch of a pre-correction gray having a dot area ratio of C=M=Y=40% (an example of a first gradation value). The patch 64 is a patch of a pre-correction gray having a dot area ratio of C=M=Y=60% (an example of a first gradation value). The patch group 65 is a group of patches of adjacent grays that are assigned in any combination of ±5% for C and M and ±10% for Y (an example of a second gradation value) relative to the dot area ratio of the patch 61. The patch group 66 is a group of patches of adjacent grays that are assigned in any combination of ±5% for C and M and ±10% for Y (an example of a second gradation value) relative to the dot area ratio of the patch 62. The patch group 67 is a group of patches of adjacent grays that are assigned in any combination of ±5% for C and M and ±10% for Y (an example of a second gradation value) relative to the dot area ratio of the patch 63. The patch group 68 is a group of patches of adjacent grays that are assigned in any combination of ±5% for C and M and ±10% for Y (an example of a second gradation value) relative to the dot area ratio of the patch 64. The number of patches included in each of the patch groups 65 to 68 is smaller than the number of patches included in each of the patch groups 55 to 58 of the gray-correction chart 50 illustrated in FIG. 16 described above. The patch groups 65 to 68 also include patches having the same dot area ratios as those of the patches 61 to 64, respectively. The sets of the patches 61 to 64 are not limited to being arranged at the four corners and may be arranged at positions at which the colorimetric values of the respective pre-correction grays are accurately obtained.

The image data of the gray-correction chart 60 is subjected to image processing by the image processing unit 18 and is output from the image output unit 19 to the image forming apparatus 2. In this case, the image processing unit 18 performs the calibration process by using the single-color TRC in step S52 without performing the profile conversion process. Then, the image forming apparatus 2 outputs the gray-correction chart 60, and the colorimeter 4 performs a color measurement process. The process then proceeds to step SM.

Step S54

The local variation difference determination unit 20 calculates a local variation difference from the colorimetric values acquired by the colorimetric value acquisition unit 11, namely, the colorimetric values of the patches 61 to 64 and the colorimetric values of the patch groups 65 to 68, and from the 10%, 20%, 40%, and 60% prediction models stored in the storage unit 14. The details of the local variation difference calculation process of the local variation difference determination unit 20 will be described with reference to FIGS. 20 and 21.

Step S541

First, the local variation difference determination unit 20 identifies the dot area ratio (C, M, Y) of one of the target grays for calculating a local variation difference. The process then proceeds to step S542.

Step S542

Then, the local variation difference determination unit 20 identifies the dot area ratio (Cn, Mn, Yn) of one target-adjacent gray, which is acquired in the gray-correction chart 60 in step S53, among the dot area ratios of the target-adjacent grays corresponding to the identified dot area ratio of the target gray.

The process then proceeds to step S543.

Step S543

As illustrated in FIG. 21, the local variation difference determination unit 20 calculates the predicted values (L1, a1, b1) from the identified dot area ratio (C, M, Y) of the target gray by using the prediction model created in the first state. As illustrated in FIG. 21, the local variation difference determination unit 20 further calculates the predicted values (L2, a2, b2) from the identified dot area ratio (Cn, Mn, Yn) of the target-adjacent gray by using the prediction model created in the first state. The process then proceeds to step S544.

Step S544

As illustrated in FIG. 21, the local variation difference determination unit 20 acquires colorimetric values (Lt, at, bt) corresponding to the identified target gray and colorimetric values (Ln, an, bn) corresponding to the identified target-adjacent gray from among the colorimetric values acquired by the colorimetric value acquisition unit 11. The process then proceeds to step S545.

Step S545

As illustrated in FIG. 21, the local variation difference determination unit 20 calculates a local variation difference $\sqrt{\{(\Delta Lm-\Delta L)^2+(\Delta am-\Delta a)^2+(\Delta bm-\Delta b)^2\}}$ in the identified target-adjacent gray from the difference ($\Delta L$, $\Delta a$, $\Delta b$) between the predicted values (L1, a1, b1) and the predicted values (L2, a2, b2), which is given by ($\Delta L$, $\Delta a$, $\Delta b$)=(L2−L1, a2−a1, b2−b1), and from the difference (ΔLm, Δam, Δbm) between the colorimetric values (Lt, at, bt) and the colorimetric values (Ln, an, bn), which is given by (ΔLm, Δam, Δbm)=(Ln−Lt, an−at, bn−bt). The difference (ΔL, Δa, Δb) is a first difference, and the difference (ΔLm, Δam, Δbm) is a second difference. The process then proceeds to step S546.

Step S546

The local variation difference determination unit 20 determines whether all of the local variation differences have been calculated for the target-adjacent grays corresponding to the identified target gray and acquired in the gray-correction chart 60 in step S53. If not all of the local variation differences for the target-adjacent grays have been calculated (step S546: No), the process proceeds to step S547. If all of the local variation differences for the target-adjacent grays have been calculated (step S546: Yes), the process proceeds to step S548.

Step S547

The local variation difference determination unit 20 identifies the dot area ratio (Cn, Mn, Yn) of another target-adjacent gray different from the identified dot area ratio of the target-adjacent gray among the dot area ratios of the target-adjacent grays corresponding to the identified dot area ratio of the target gray. The process then returns to step S543.

Step S548

The local variation difference determination unit 20 averages all the local variation differences for the target-adjacent grays corresponding to the identified dot area ratio of the target gray, and acquires the average as the local variation difference for the target gray. The process then proceeds to step S549.

Step S549

The local variation difference determination unit 20 determines whether the local variation differences for all of the target grays have been acquired. If the local variation differences for all of the target grays have not been acquired (step S549: No), the process proceeds to step S550. If the local variation differences for all of the target grays have been acquired (step S549: Yes), the local variation difference calculation process ends, and then the process proceeds to step S55 in FIG. 17.

Step S550

The local variation difference determination unit 20 identifies the dot area ratio (C, M, Y) of another target gray different from the identified dot area ratio of the target gray among all of the target grays. The process then returns to step S542.

Step S55

The local variation difference determination unit 20 determines whether each the respective local variation difference calculated for the target grays is greater than or equal to a predetermined threshold (second threshold). If at least one of the local variation differences for the target grays is greater than or equal to the threshold (step S55: Yes), the process proceeds to step S56. If all of the local variation differences for the target grays are less than the threshold (step S55: No), the process proceeds to step S58.

Step S56

The chart image generation unit 16 generates a prediction model update chart 70 illustrated in FIG. 19, for example. The prediction model update chart 70 includes a patch group for adjacent grays corresponding to a target gray for which the local variation difference is determined by the local variation difference determination unit 20 to be greater than or equal to the threshold. In one example, the local variation difference determination unit 20 determines that the local variation differences for the 10% target gray and the 60% target gray are greater than or equal to the threshold.

As illustrated in FIG. 19, the prediction model update chart 70 includes patch groups 75 and 78.

The patch group 75 is a group of patches of adjacent grays that are assigned in combinations of ±5% for C and M and ±10% for Y (an example of a second gradation value) relative to the dot area ratio of the 10% target gray. The patch group 78 is a group of patches of adjacent grays that are assigned in combinations of ±5% for C and M and ±10% for Y (an example of a second gradation value) relative to the dot area ratio of the 60% target gray.

The image data of the prediction model update chart 70 is subjected to image processing by the image processing unit 18 and is output from the image output unit 19 to the image forming apparatus 2. In this case, the image processing unit 18 performs the calibration process by using the single-color TRC in step S52 without performing the profile conversion process. Then, the image forming apparatus 2 outputs the prediction model update chart 70, and the colorimeter 4 performs a color measurement process. The process then proceeds to step S57.

Step S57

Then, the colorimetric value acquisition unit 11 acquires the colorimetric values of the prediction model update chart 70 from the colorimeter 4. The prediction model creation unit 12 acquires each of the grays of the patch group 75 from among the colorimetric values as a 10% target-adjacent gray, and creates a prediction model from the 10% target-adjacent gray, for predicting a colorimetric value from a dot area ratio around 10%. This prediction model is a 10% prediction model, and is an example of a second prediction model. The prediction model creation unit 12 further acquires each of the grays of the patch group 78 from among the colorimetric values as a 60% target-adjacent gray, and creates a prediction model from the 60% target-adjacent gray, for predicting a colorimetric value from a dot area ratio around 60%. This prediction model is a 60% prediction model, and is an example of a second prediction model. The process then proceeds to step S58.

Step S58

The TRC generation unit 15 acquires the colorimetric values of the patches 61 to 64 from among the colorimetric values acquired by the colorimetric value acquisition unit 11 for the gray-correction chart 60. Then, the TRC generation unit 15 calculates an average value of the colorimetric values of the patch 61 at the four positions to acquire a 10% pre-correction gray. The TRC generation unit 15 also calculates an average value of the colorimetric values of the patch 62 at the four positions to acquire a 20% pre-correction gray. The TRC generation unit 15 also calculates an average value of the colorimetric values of the patch 63 at the four positions to acquire a 40% pre-correction gray. The TRC generation unit 15 also calculates an average value of the colorimetric values of the patch 64 at the four positions to acquire a 60% pre-correction gray. The 10% pre-correction gray, the 20% pre-correction gray, the 40% pre-correction gray, and the 60% pre-correction gray are examples of a third colorimetric value. Then, the TRC generation unit 15 acquires, for the dot area ratio of each pre-correction gray, a correction value so as to match the corresponding target gray by using the corresponding prediction model. In this case, the TRC generation unit 15 acquires correction values for the dot area ratios of the 20% pre-correction gray and the 40% pre-correction gray by using the prediction model created in the first state described above. The TRC generation unit 15 further acquires correction values for the dot area ratios of the 10% pre-correction gray and the 60% pre-correction gray by using the prediction model created in step S57 described above (i.e., the prediction model created in the second state). The gray correction value calculation process, which is a process for calculating a correction value by using the TRC generation unit 15, is performed in accordance with the flowchart illustrated in FIG. 11. The process then proceeds to step S59.

Step S59

Then, the TRC generation unit 15 reflects a correction based on the calculated correction values in the single-color TRC obtained in step S52 to generate a single-color TRC (gray-corrected single-color TRC). Then, the TRC generation unit 15 updates the single-color TRC stored in the storage unit 14 with the generated single-color TRC. After that, the image processing unit 18 executes a calibration process by using the single-color TRC (gray-corrected single-color TRC) to perform gray correction on the input device value to obtain an output device value.

Then, the gray correction process of the image processing apparatus 1a ends.

As described above, the configuration of the image processing apparatus 1a according to this embodiment makes it possible to accurately correct color mixtures while keeping the load of a color measurement process low for each correction. To be more specific, printing of a chart and color measurement are not performed more than necessary to create a prediction model at the gray correction time. This provides accurate gray correction while reducing the load of the color measurement on the user.

The related art imposes a heavy load on a user who performs color measurement of adjacent grays each time correction is performed. In the related art, the colorimetric values in the current state are made to match the target values in the past state, where the past state is the state at calibration and the current state is the state at print job processing. A large change in color mixing characteristic between the calibration time and the print job processing time makes accurate correction difficult.

According to one or more embodiments of the present disclosure, color mixtures are accurately corrected while keeping the load of a color measurement process low for each correction.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In addition, the programs to be executed by the image processing apparatuses 1 and 1a according to the embodiments described above may be configured to be pre-installed in a ROM or the like and provided.

The programs to be executed by the image processing apparatuses 1 and 1a according to the embodiments described above may be configured to be recorded in any computer-readable 1a recording medium, such as a compact disc read only memory (CD-ROM), a flexible disk (FD), a CD-R, or a DVD, in an installable or executable file format and provided as a computer program product.

In addition, the programs to be executed by the image processing apparatuses 1 and 1a according to the embodiments described above may be configured to be stored in a computer connected to a network such as the Internet and provided by being downloaded via the network. In addition, the programs to be executed by the image processing apparatuses 1 and 1a according to the embodiments described above may be configured to be provided or distributed via a network such as the Internet.

In addition, the programs to be executed by the image processing apparatuses 1 and 1a according to the embodiments described above have module configurations including the functional units described above. In actual hardware, a CPU (or processor) reads the programs from the ROM and executes the read programs to load the functional units described above onto a main storage device and generate the functional units on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image processing apparatus that performs color matching of colors acquired in two different states and having an identical target gradation value, the two different states including a first state and a second state, the image processing apparatus comprising circuitry configured to:

acquire a first colorimetric value of a target color mixture from a chart printed out from an image forming apparatus, based on one or more first gradation values, in the first state, the first colorimetric value corresponding to each of the one or more first gradation values;

acquire a second colorimetric value of an adjacent color mixture, for a second gradation value adjacent to at least one first gradation value among the one or more first gradation values, from the chart printed out from the image forming apparatus in the first state and acquire a second colorimetric value of an adjacent color mixture, for a second gradation value adjacent to a remaining first gradation value other than the at least one first gradation value among the one or more first gradation values, from a chart printed out from the image forming apparatus in the second state, the second state being a state that occurs chronologically after the first state;

acquire a third colorimetric value of a pre-correction color mixture from a chart printed out from the image forming apparatus, based on each of the one or more first gradation values, in the second state, the third colorimetric value corresponding to each of the one or more first gradation values;

add a difference between the first colorimetric value and the second colorimetric value corresponding to the first colorimetric value to the third colorimetric value corresponding to the first colorimetric value and calculate a predicted colorimetric value of the target color mixture;
determine whether a color difference between the predicted colorimetric value and the first colorimetric value corresponding to the predicted colorimetric value is less than or equal to a first threshold;
acquire, as a correction value, the second gradation value corresponding to the second colorimetric value from which the predicted colorimetric value corresponding to the color difference is calculated, in response to the color difference being less than or equal to the first threshold; and
correct a corresponding one of the one or more first gradation values by using the correction value such that a colorimetric value of the pre-correction color mixture becomes equal to a colorimetric value of the target color mixture.

2. The image processing apparatus according to claim 1, wherein the circuitry is further configured to:
create respective prediction models corresponding to the one or more first gradation values, for predicting a colorimetric value from a gradation value, the prediction models being created based on the second gradation value adjacent to the at least one first gradation value and the second gradation value adjacent to the remaining first gradation value; and
determine, as the difference, a difference between the first colorimetric value predicted from each of the one or more first gradation values by using a corresponding one of the prediction models and the second colorimetric value predicted from the second gradation value corresponding to the first gradation value by using the corresponding one of the prediction models.

3. The image processing apparatus according to claim 1, wherein the circuitry is further configured to:
acquire the second colorimetric value for the second gradation value adjacent to the at least one first gradation value, the at least one first gradation value including a first gradation value having a low gradation among the one or more first gradation values; and
acquire the second colorimetric value for the second gradation value adjacent to the remaining first gradation value, the remaining first gradation value including a first gradation value having a higher gradation than the at least one first gradation value among the one or more first gradation values.

4. The image processing apparatus according to claim 2, wherein the circuitry is further configured to:
acquire respective second colorimetric values for second gradation values adjacent to all of the one or more first gradation values, from the chart printed out from the image forming apparatus in the first state and the chart printed out from the image forming apparatus in the second state;
create respective first prediction models corresponding to the one or more first gradation values, based on the second colorimetric values acquired by the second acquisition unit in the first state;
calculate a local variation difference between a first difference and a second difference, the first difference being a difference between a colorimetric value predicted from each of the one or more first gradation values by using a corresponding one of the first prediction models and a colorimetric value predicted from a second gradation value corresponding to the first gradation value among the second gradation values by using the corresponding one of the first prediction models, the second difference being a difference between the first colorimetric value corresponding to the first gradation value in the second state and a corresponding one of the second colorimetric values for the second gradation value corresponding to the first gradation value;
determine whether the local variation difference is greater than or equal to a second threshold;
acquire the second colorimetric value for the second gradation value adjacent to the first gradation value corresponding to the local variation difference, from the chart printed out from the image forming apparatus in the second state in response to the local variation difference being greater than or equal to the second threshold;
create a second prediction model, based on the second colorimetric value acquired by the second acquisition unit in response to the local variation difference being greater than or equal to the second threshold, the second prediction model corresponding to the first gradation value corresponding to the acquired second colorimetric value;
determine, as the difference, in response to presence of the second prediction model corresponding to the first gradation value, a difference between the first colorimetric value predicted from the first gradation value by using the second prediction model and the second colorimetric value predicted from the second gradation value corresponding to the first gradation value by using the second prediction model; and
determine, as the difference, in response to absence of the second prediction model corresponding to the first gradation value, a difference between the first colorimetric value predicted from the first gradation value by using a first prediction model corresponding to the first gradation value among the first prediction models and the second colorimetric value predicted from the second gradation value corresponding to the first gradation value by using the first prediction model corresponding to the first gradation value.

5. The image processing apparatus according to claim 1, wherein the target color mixture, the adjacent color mixtures, and the pre-correction color mixture are each a mixture of cyan, magenta, and yellow.

6. The image processing apparatus according to claim 1, wherein the first colorimetric value, the second colorimetric values, and the third colorimetric value are each a color value in an $L^*a^*b^*$ color space.

7. An information processing system comprising:
the image processing apparatus according to claim 1;
the image forming apparatus; and
a colorimeter configured to obtain the first colorimetric value, the second colorimetric value, and the third colorimetric value.

8. An image processing method for performing color matching of colors acquired in two different states and having an identical target gradation value, the two different states including a first state and a second state, the image processing method comprising:
acquiring a first colorimetric value of a target color mixture from a chart printed out from an image forming apparatus, based on one or more first gradation values, in the first state, the first colorimetric value corresponding to each of the one or more first gradation values;
acquiring a second colorimetric value of an adjacent color mixture, for a second gradation value adjacent to at least one first gradation value among the one or more first gradation values, from the chart printed out from the image forming apparatus in the first state and acquiring a second colorimetric value of an adjacent color mixture, for a second gradation value adjacent to a remaining first gradation value other than the at least one first gradation value among the one or more first gradation values, from a chart printed out from the image forming apparatus in the second state, the second state being a state that occurs chronologically after the first state;

acquiring a third colorimetric value of a pre-correction color mixture from a chart printed out from the image forming apparatus, based on each of the one or more first gradation values, in the second state, the third colorimetric value corresponding to each of the one or more first gradation values;

adding a difference between the first colorimetric value and the second colorimetric value corresponding to the first colorimetric value to the third colorimetric value corresponding to the first colorimetric value and calculating a predicted colorimetric value of the target color mixture;

determining whether a color difference between the predicted colorimetric value and the first colorimetric value corresponding to the predicted colorimetric value is less than or equal to a first threshold;

acquiring, as a correction value, the second gradation value corresponding to the second colorimetric value from which the predicted colorimetric value corresponding to the color difference is calculated, in response to the color difference being less than or equal to the first threshold; and correcting a corresponding one of the one or more first gradation values by using the correction value such that a colorimetric value of the pre-correction color mixture becomes equal to a colorimetric value of the target color mixture.

9. A non-transitory computer-executable medium storing a program storing instructions which, when executed by a processor, causes the computer to perform a method comprising:

acquiring a first colorimetric value of a target color mixture from a chart printed out from an image forming apparatus, based on one or more first gradation values, in the first state, the first colorimetric value corresponding to each of the one or more first gradation values;

acquiring a second colorimetric value of an adjacent color mixture, for a second gradation value adjacent to at least one first gradation value among the one or more first gradation values, from the chart printed out from the image forming apparatus in the first state and acquiring a second colorimetric value of an adjacent color mixture, for a second gradation value adjacent to a remaining first gradation value other than the at least one first gradation value among the one or more first gradation values, from a chart printed out from the image forming apparatus in the second state, the second state being a state that occurs chronologically after the first state;

acquiring a third colorimetric value of a pre-correction color mixture from a chart printed out from the image forming apparatus, based on each of the one or more first gradation values, in the second state, the third colorimetric value corresponding to each of the one or more first gradation values;

adding a difference between the first colorimetric value and the second colorimetric value corresponding to the first colorimetric value to the third colorimetric value corresponding to the first colorimetric value and calculating a predicted colorimetric value of the target color mixture;

determining whether a color difference between the predicted colorimetric value and the first colorimetric value corresponding to the predicted colorimetric value is less than or equal to a first threshold;

acquiring, as a correction value, the second gradation value corresponding to the second colorimetric value from which the predicted colorimetric value corresponding to the color difference is calculated, in response to the color difference being less than or equal to the first threshold; and correcting a corresponding one of the one or more first gradation values by using the correction value such that a colorimetric value of the pre-correction color mixture becomes equal to a colorimetric value of the target color mixture.

\* \* \* \* \*